United States Patent
Onomatsu

(10) Patent No.: US 8,120,705 B2
(45) Date of Patent: Feb. 21, 2012

(54) TELEVISION HAVING A CONNECTING TERMINAL FOR CONNECTING A PLAYER DEVICE

(75) Inventor: Takehiro Onomatsu, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 782 days.

(21) Appl. No.: 12/284,502

(22) Filed: Sep. 23, 2008

(65) Prior Publication Data
US 2009/0086097 A1    Apr. 2, 2009

(30) Foreign Application Priority Data
Sep. 27, 2007   (JP) ................................. 2007-252123

(51) Int. Cl.
*H04N 7/00* (2011.01)
*H04N 5/64* (2006.01)

(52) U.S. Cl. ........................................ 348/552; 348/838

(58) Field of Classification Search .................. 348/552, 348/705, 706, 838, 839; 455/344, 346; 725/133, 725/141, 153; 386/218, 219, 230, 234, 369–372; 345/168, 169; 715/704, 864
See application file for complete search history.

(56) References Cited

U.S. PATENT DOCUMENTS

| | | | |
|---|---|---|---|
| 6,084,638 A * | 7/2000 | Hare et al. ..................... | 348/552 |
| 6,654,539 B1 * | 11/2003 | Duruoz et al. ................ | 386/343 |
| 6,724,981 B1 * | 4/2004 | Park et al. ..................... | 386/231 |
| 7,699,229 B2 * | 4/2010 | Bennett et al. ........... | 235/472.01 |
| 2002/0171763 A1 * | 11/2002 | Stecyk et al. ................. | 348/552 |
| 2005/0135790 A1 * | 6/2005 | Hutten ........................ | 386/125 |
| 2005/0155068 A1 * | 7/2005 | Chang ............................. | 725/75 |
| 2007/0206346 A1 * | 9/2007 | Okuley .......................... | 361/679 |
| 2008/0086550 A1 * | 4/2008 | Evora et al. ................... | 709/223 |
| 2008/0109734 A1 * | 5/2008 | Castagno ....................... | 715/740 |
| 2008/0138028 A1 * | 6/2008 | Grady et al. ...................... | 386/1 |

FOREIGN PATENT DOCUMENTS

| | | |
|---|---|---|
| JP | H11-275503 A | 10/1999 |
| JP | 2006-111252 A | 4/2006 |

* cited by examiner

*Primary Examiner* — Victor Kostak
(74) *Attorney, Agent, or Firm* — Yokoi & Co., U.S.A., Inc.; Toshiyuki Yokoi

(57) ABSTRACT

The present invention discloses a television that includes a speaker; a display; a tuner for receiving television broadcasting signals and generates first sound signals and first image signals based on the television broadcasting signals; a connecting terminal for connecting to a player device having an operation panel generating operation commands according to user's operations; an operation macro outputting unit for outputting an operation macro same as a plurality of the operation commands to the player device in order to make the player device perform consecutive operations, through the connecting terminal.

6 Claims, 20 Drawing Sheets

Fig. 5

| CM | | input source | | | | | |
|---|---|---|---|---|---|---|---|
| mode | channel | sound | image | frequency | current flag | disabling flag | last flag |
| normal mode | 1 | tuner | tuner | □□Mhz | | | |
| normal mode | 2 | tuner | tuner | □■Mhz | ◎ | | |
| normal mode | 3 | tuner | tuner | ×□Mhz | | | △ |
| ‥ | ‥ | ‥ | ‥ | ‥ | ‥ | ‥ | ‥ |
| normal mode | 98 | tuner | tuner | ××Mhz | | | |
| normal mode | 99 | tuner | tuner | □×Mhz | | | |
| external input mode | video 1 mode | input terminal | input terminal | | | | |
| external input mode | media player mode α | docking unit | docking unit | | | ● | |
| external input mode | media player mode β | docking unit | OSD signals | | | ● | |

UI image for the charge setting

☆ function for preventing  ☑ ON
memory effect problem
☐ OFF

In case you selected ON,
☆ How much is amount of charge to start charging?
☐ 10%  ☑ 20%  ☐ 30%
☐ 40%  ☐ 50%

☆ How much is amount of charge to finish charging?
☐ 50%  ☐ 60%  ☐ 70%  ☐ 80%
☑ 90%  ☐ 100%

Fig. 18
Please select folders where media files for slide show and playing are stored.
Please select picture folder (selection folder F1)
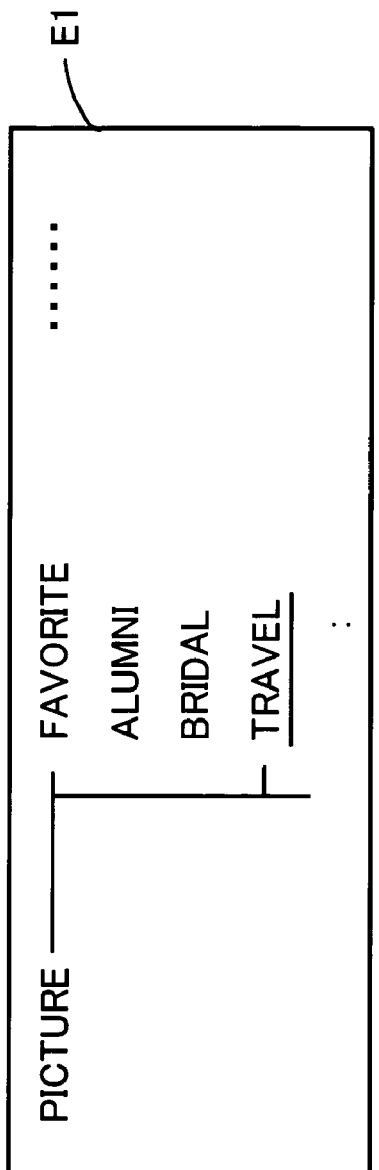
Please select music folder (selection folder F2)
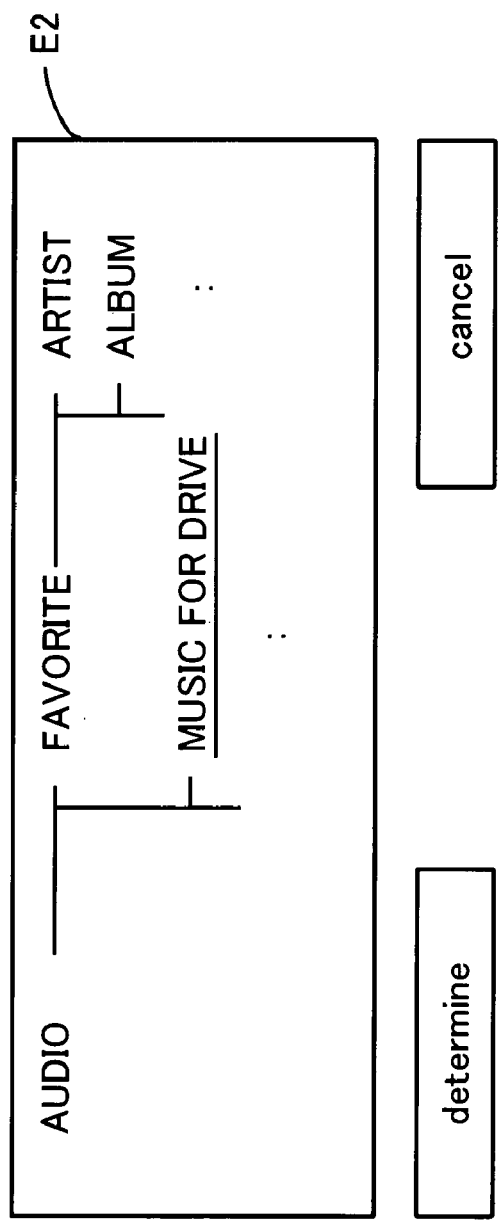

TELEVISION HAVING A CONNECTING TERMINAL FOR CONNECTING A PLAYER DEVICE

CROSS-REFERENCES TO RELATED APPLICATIONS

The present application is related to the Japan Patent Application No. 2007-252123, filed Sep. 27, 2007, the entire disclosure of which is expressly incorporated by reference herein.

BACKGROUND OF THE INVENTION (1) Field of the Invention

The present invention relates television that has a function for connecting to a media player.

(2) Description of the Related Art

Currently, media players that can play sounds and images, become popular. Media players are devices that can play specific contents (media files). As an example of the media players, iPod™ provided by Apple Inc. is well known. The media players have functions to play specific media files in their portable and small chassis. Such the media players can transmit sounds, images and data to external devices that are connected to the media players. Some of the media players can cooperate with the external devices. And, not only in the media player, some technologies to cooperate with the external devices are suggested (see JPA-H11-275503 and JPA-2006-111252) According to JPA-H11-275503, a television that can connect to a PC card, a data recording medium and a serial cable, automatically input data from them and play the data, is disclosed. Further, in JPA-2006-111252, a car audio system output a signal to make the media player play the media file when the media player is connected thereto.

The television disclosed in JPA-H11-275503 has a problem that it is not possible to take advantage of an plying function of the media player to play the data, because the data are played by the television itself. Recently, the media players can store a lot of the media files because of spread of mass storage devices. Further, the media players have complicated functions and complicated operations are needed to use the functions. Therefore, the car audio system disclosed in JPA-2006-111252 can not make the media player perform the complicated operations that users want to perform.

BRIEF SUMMARY OF THE INVENTION

The present invention discloses a television that includes a speaker; a display; a tuner for receiving television broadcasting signals and generates first sound signals and first image signals based on the television broadcasting signals; a connecting terminal for connecting to a player device having an operation panel generating operation commands according to user's operations; an operation macro outputting unit for outputting an operation macro same as a plurality of the operation commands to the player device in order to make the player device perform consecutive operations, through the connecting terminal.

These and other features, aspects, and advantages of invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and the drawings are to be used not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

FIG. 5 is an exemplary diagram showing a channel map.

FIG. 16 is an exemplary diagram of a UI image for the charge setting.

FIG. 18 is an exemplary diagram showing a UI image of the modified embodiment.

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

The embodiment of the present invention will be explained as an order described below.

Figure 1:
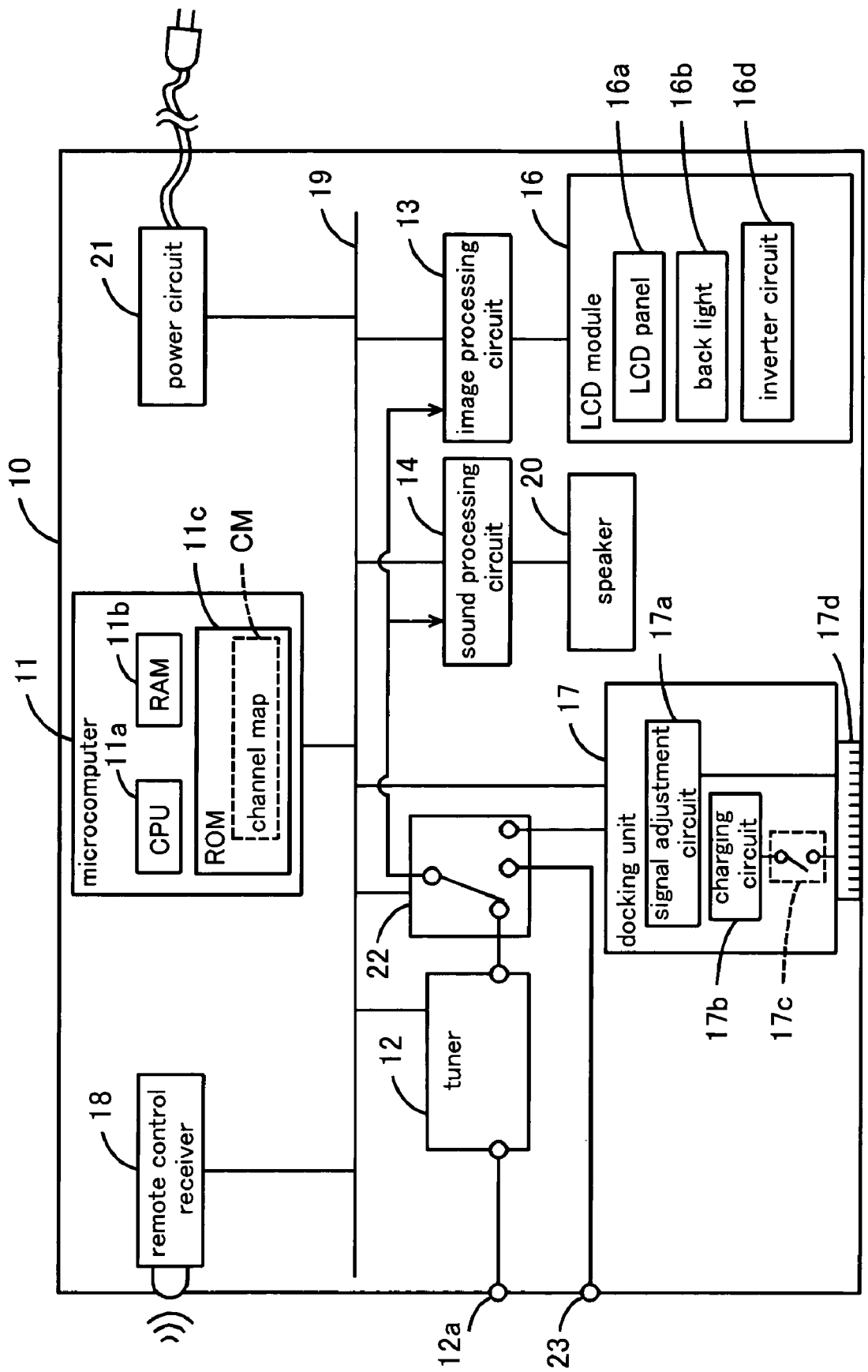
FIG. 1 is an exemplary block diagram showing a configuration of a television having a function for connecting to a media player.

A. A configuration of a television having a function for connection to a media player:

B. A process performed when the media player is connected:

C. A process performed after the media player is connected:

D. A process performed when the media player is disconnected:

E. Modified embodiments:
  E-1. The modified embodiment of the dummy image:
  E-2. A power saving operation:
  E-3. The modified embodiment of charging:
  E-4. The modified embodiment of an operation macro:
  E-5. The modified embodiment of a connection:

A. A Configuration of a Television having a Function for Connection to a Media Player FIG. 1 is an exemplary block diagram showing a configuration of a television, of the present invention, having a function for connecting to a media player. The television 10 is comprised of a microcomputer 11, a tuner 12, an image processing circuit 13, a sound processing circuit 14, an input terminal 15, an LCD (Liquid Crystal Display) module 16, a docking unit 17, a remote control receiver 18, a bus 19, a speaker 20, a power circuit 21, a switching circuit (switching unit) 22 and an external input terminal 23. Components 11-18 are connected through the bus 19 each other and can mutually transmit data each other. Further the components 11-20 are connected to the power circuit 21 and are supplied electric power from the power circuit 21. The power circuit 21 can supply a standby power for functioning at least a timer of the microcomputer 11 e.g. and an ordinary main power. The microcomputer 11 is comprised of a CPU (Central Processing Unit) 11a, RAM (Random Access Memory) 11b and ROM (Read Only Memory) 11c. The CPU 11a executes computing for performing processes described below, with complying with a program code stored in the ROM 11c. Then, data and parameters that are needed for the computing, are buffered in the RAM 11b.

The tuner 12 has an antenna terminal 12a. The tuner 12 extracts digital television signals with a frequency corresponding to a desired broadcasting channel, from signals input through the antenna terminal 12a. The tuner 12 performs detecting, de-multiplexing and extracting the digital television signals. And the tuner 12 generates image signals and sound signals. The image signals (first image signals) generated by the tuner 12 are output to the image processing circuit 13. The sound signals (first sound signals) generated by the tuner 12 are output to the sound processing circuit 14. In addition, frequency information for tuner 12 to synthesize and multiplexing information are obtained from a channel map CM stored in the ROM 11c. A writable media is applied as the ROM 11c, because the channel map has to be updated corresponding to user's favorites and broadcasting condition. The switching circuit 22, for example, connected with the external input terminal 23 such as an S-type terminal (i.e. Separate video or S-Video terminal) or a D1-type terminal e.g. And the switching circuit 22 can switch to output image signals and sound signals received through the external input terminal 23 into the image processing circuit 13 and the sound processing circuit 14.

The image processing circuit 13 performs image modification (for example, brightness adjustments and contrast adjustments e.g.) processing to the image signals input from the tuner 12 and the external input terminal 23. Further, image processing circuit 13 performs processing for interposing and replacing OSD (On Screen Display) signals received from the microcomputer 12 to the image signals input from the tuner 12. On the other hand, a sound volume and balance e.g. of the sound signals output to the sound processing circuit 14 are adjusted by the sound processing circuit 14. The image signals modified by the image processing circuit 13 is output to the LCD module 16, and each of liquid crystal elements of an LCD panel 16a built in the LCD module 16 is driven based on the image signals.

A back light 16b is placed behind the LCD panel 16a. And lighting of the back light 16b is controlled by an inverter circuit 16d. Images can be displayed, because light emitted by the back light 16b is transmitted and polarized through the LCD panel 16a whose liquid crystal elements are driven based on the image signals. On the other hand, the sound signals output from the sound processing circuit 14 are input to the speaker 20 and are output from the speaker 20. The remote control receiver 18 has a photo diode that can receive pulses of infrared output from an external remote control and convert the pulses of infrared to electric signals. The remote control receiver 18 converts the electric signals to a predetermined format and output the electric signals (operation commands) to the microcomputer 11.

The docking unit 17 (signal accepting unit) is an interface between the television 10 and the external media player. The docking unit 17 is comprised of a signal adjustment circuit 17a, a charging circuit 17b, a charging switch 17c and a connecting terminal unit 17d. The connecting terminal unit 17d is comprised of terminals for connecting the media player and the docking unit 17. More concretely, the connecting terminal unit 17d is comprised of a terminal for transmitting the sound signals and the image signals from the media player to the television, a terminal for supplying the electric power form the television to the media player and a terminal for mutually transmitting control signals between the media player and the television, for example, through a serial data communication.

The signal adjustment circuit 17a adjusts the sound signals and the image signals input from the media player, and outputs the sound signals and the image signals to the image processing circuit 13 and the sound processing circuit 14 through the switching circuit 22. Here, the signal adjustment circuit 17a detects the sound signals and the image signals, and converts image resolutions of the image signals to be suitable for displaying at the television 10. The sound signals and the image signals output from the signal adjustment circuit 17a are input to the switching circuit 22. The switching circuit 22 switches whether the sound signals and the image signals are output to next circuits or not based on an instruction from the microcomputer 11. The charging circuit 17b is supplied the electric power from the power circuit 21, and charges a battery of the media player with generating an electric power that is suitable for charging the battery of the media player. The charging switch 17c is a mechanical switch and can switch whether the charging circuit 17b performs charging the battery or the charging circuit 17b does not performs charging the battery, based on user's operation.

Figure 2:
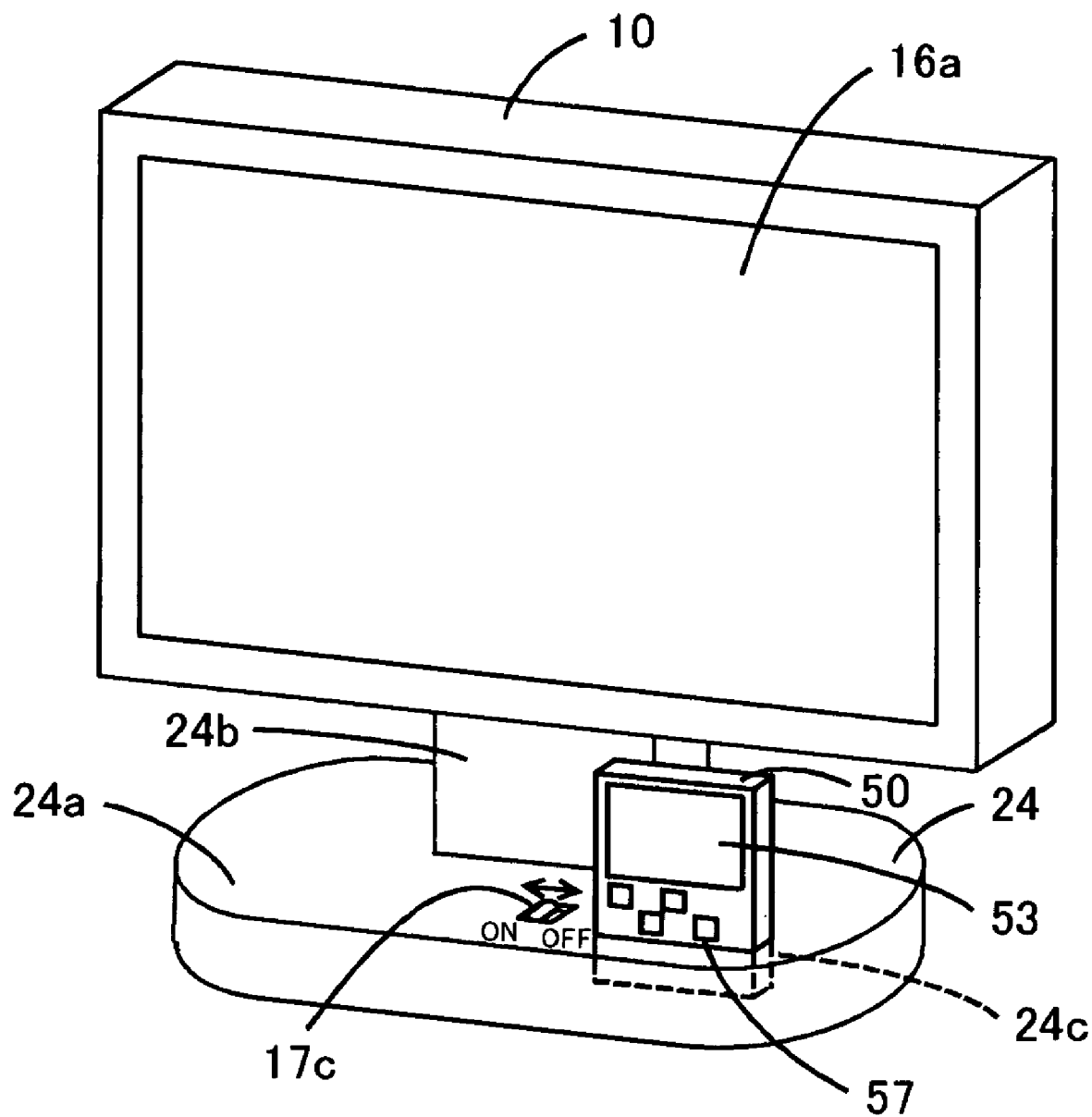
FIG. 2 is an exemplary perspective view showing an appearance of the television.

FIG. 2 is an exemplary perspective view of appearances of the television 10 and the media player. The media player is corresponding to a player device of the present invention. According to FIG. 2, the television 10 has the LCD panel 16a in a substantial thin plane shape standing substantially vertically. Abovementioned circuits are placed behind the LCD panel 16a. The television 10 has a foot part 24. The foot part is comprised of a base part 24a in a substantial plane shape that can widely contact with a horizontal plane, and a brace 24b that is substantially vertically extended from the base part 24a and is coupled to the LCD panel 16a. A hollow portion 24c where a bottom edge of the media player 50 can be inserted, is formed by making a hollow downward from an upper plane of the base part 24a. The media player 50 is supported to be vertical by fitting together by inserting the bottom edge of the media player 50 into the hollow portion 24c. Then, for preventing a top edge of the media player 50 from conflicting to a bottom edge of the LCD panel 16a, the hollow part 24c is formed at a position forward to the LCD panel 16a. An I/O (Input/Output) terminal unit 59 (not illustrated) is formed in the bottom edge of the media player 50, and abovementioned connecting terminal unit 17d is formed in the hollow portion 24c.

The I/O terminal unit 59 and the connecting terminal unit 17d are formed at corresponding position each other, therefore the I/O terminal unit 59 and the connecting terminal unit 17d can electrically connect when the bottom edge of the media player 50 is inserted into the hollow portion 24c. Accordingly, the image signals and the sound signals can be transmitted from the media player 50 to the docking unit 17, through the I/O terminal unit 59 and the connecting terminal unit 17d. Also, the electric power can be supplied from the television 10 to the media player 50, and the control signals can be mutually transmitted between the television 10 and the media player 50. The charging switch 17c is formed at a position where is on the upper plane of the base part 24a and is adjacent to the hollow portion 24c. The charging switch 17c can be slid. If users slide the charging switch 17c to an on-side direction, the charging of the media player 50 is turned on. And if users slide the charging switch 17 to an off-side direction (opposite to the on-side direction); the charging of the media player 50 is turned off. In particular, connection and disconnection of a power supply line connecting the charging circuit 17b and the connecting terminal unit 17d are switched.

Figure 3:
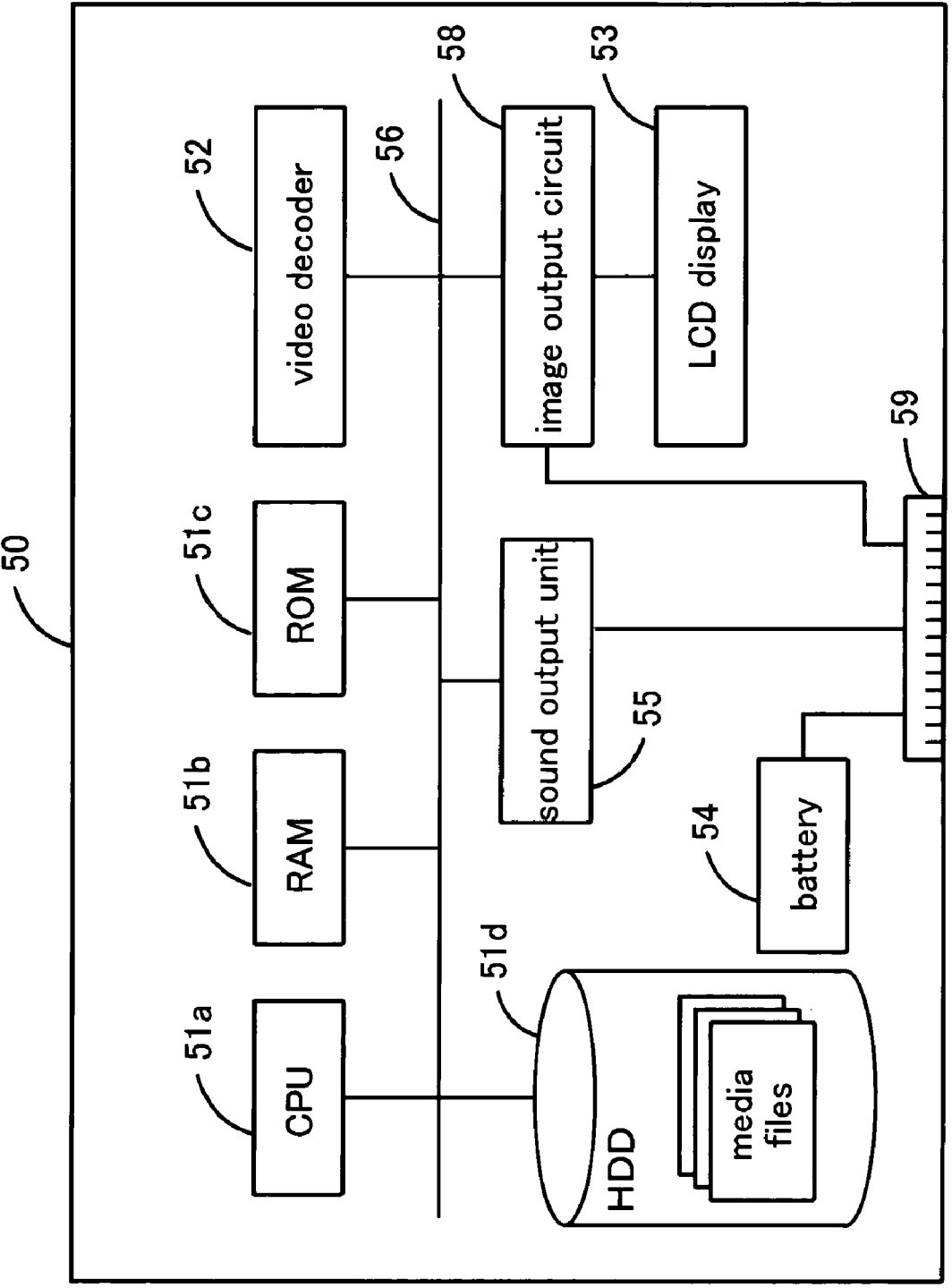
FIG. 3 is an exemplary block diagram showing a configuration of the media player.

FIG. 3 is an exemplary block diagram of the media player 50. As illustrated, the media player 50 is comprised of a CPU 51a, a RAM 51b, a HDD (hard disk drive) 51d, a video decoder 52, an LCD display 53, a battery 54, a sound output unit 55, a bus 56, an operation panel 57, an image output circuit 58 and the I/O terminal unit 59. The CPU 51a performs an O/S (Operating System) and application programs to realize functions of the media player 50, with extracting program data read from the ROM 51c on the RAM 51b. The HDD (storing unit) 51d stores each kind of media files and image files complying with a file system adopted by the OS.

In particular, the HDD (storing unit) 51d stores video files whereby sounds and motion-images can be played, sound files whereby sounds can be played, picture files whereby still-images can be played, and so on. The O/S can distinguish kinds of these media files by extensions of file names of these media files and headers appended to these media files. The video decoder 52 is provided as an ASIC (Application Specific Integrated Circuits), because complicated extracting processes are especially needed to play the video files. The LCD display 53 displays UI (User Interface) images output by the application programs performed by the CPU 51, the motion-images decoded by the video decoder 52 and the still-images.

For example, the battery 54 is comprised of lithium-ion cells. The battery 54 can be charged by supplying external electric powers and can supply electric powers to each components of the media player 50. The sound output unit 55 is comprised of an amp, a headphones terminal and so on, and outputs sound with a predetermined volume to the headphones. The operation panel 57 is comprised of buttons to manipulate complying with the UI images, for operating the media player 50. The I/O terminal unit 59 inputs the image signals from the image output circuit 58 and inputs the sound signals from the sound output unit 55. And, the I/O terminal unit 59 is connected to the battery 54. Therefore, the electric power input from the television 10 to the I/O terminal unit 59, can be supplied to the battery 54 as an electric source for charging. Further, the I/O terminal unit 59 can communicate data to the application programs performed by the CPU 51a, because the I/O terminal unit 59 is connected to the CPU 51a through the bus 56.

B. A Process Performed when the Media Player is Connected

Figure 4:
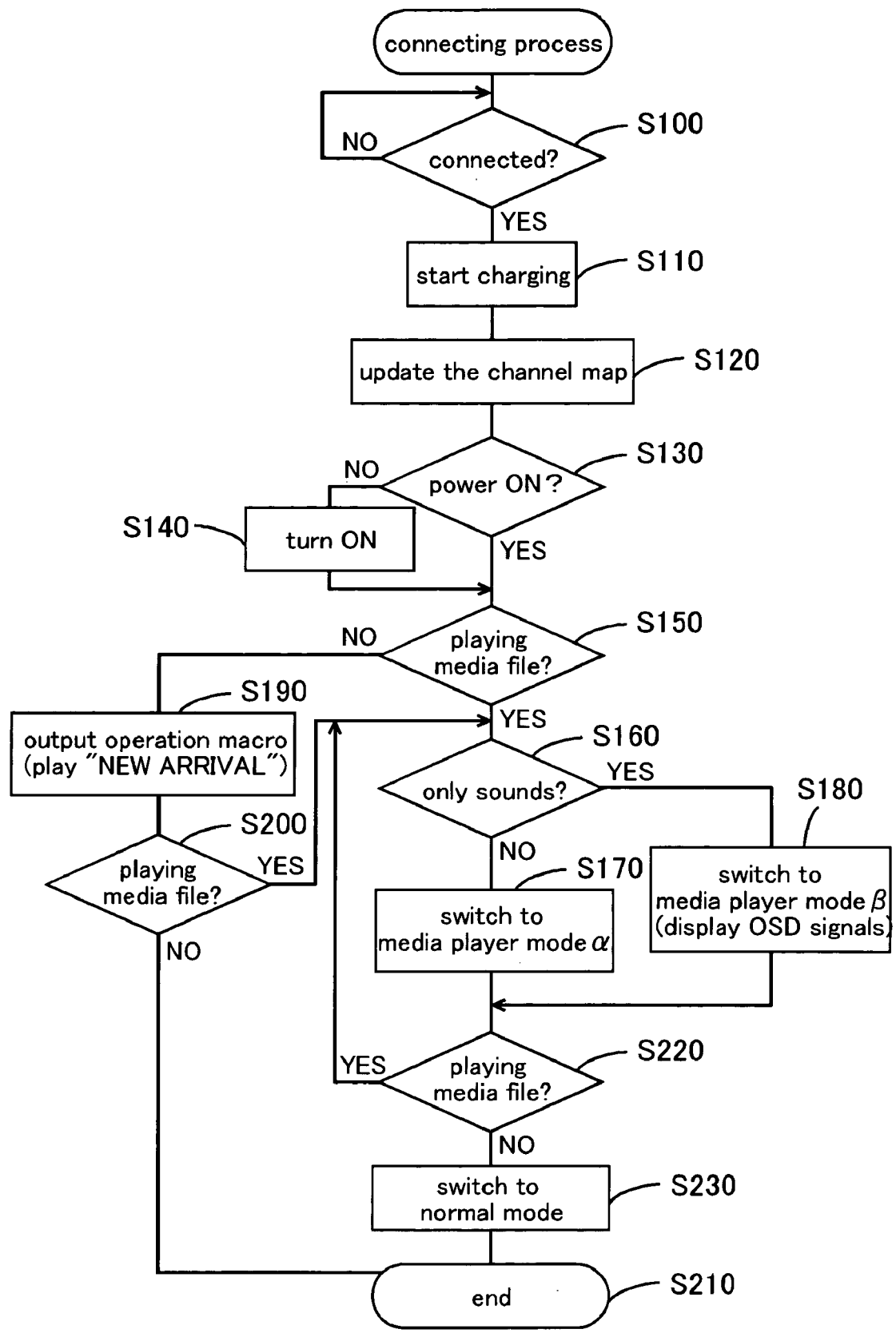
FIG. 4 is an exemplary flowchart of a connecting process performed when the media player is connected to the television.

FIG. 4 is an exemplary flowchart of a connecting process performed when the media player 50 is connected to the television 10. The process illustrated in FIG. 4 is a process that is mainly performed by the microcomputer 11 of the television 10 when the bottom edge of the media player 50 is inserted into the hollow portion 24c. First, the microcomputer 11 waits and detects the insertion of the bottom edge of the media player 50 into the hollow portion 24c in step S100. Then the television 10 have to be supplied at least the standby power, because the television 10 needs small electric power to detect the insertion of the bottom edge of the media player 50. As a concrete method for detecting the insertion of the bottom edge of the media player 50 into the hollow portion 24c (connection detecting unit), for example, a method detecting a change of resistance of the connecting terminal unit 17d that is affected by an electrical connection between the connecting terminal unit 17d and the I/O terminal unit 59 of the media player 50, can be applied. Further, a method using a mechanical switch operated by inserting the bottom edge of the media player 50 into the hollow portion 24c, can be also applied.

In case the microcomputer 11 detects the insertion of the bottom edge of the media player 50, the microcomputer 11 instruct for the charging circuit 17b to generate an electric power for charging the battery 54 of the media player 50 in step S110 (charging unit). Here, if the charging switch 17c is slid to the off-side direction, the power supply line for connecting the charging circuit 17b and the connecting terminal unit 17d is disconnected. Therefore, the battery 54 is not charged, when the charging switch 17c is slid to the off-side direction (charging restriction unit). On the other hand, if the charging switch 17c is slid to the on-side direction, the power supply line for connecting the charging circuit 17b and the connecting terminal unit 17d is connected. Therefore, the battery 54 is charged, when the charging switch 17c is slid to the on-side direction. That is, users can select whether to perform to charge the battery or not when the media player 50 is connected to the television 10, by manipulating the charging switch 17c. Therefore, unintentional and vain power consumption can be prevented.

In step S120, the microcomputer 11 acquires the channel map CM recorded in the ROM 11c and updates the channel map CM. The microcomputer 11 performs a process to rewrite the updated channel map CM in the ROM 11c. FIG. 5 is an exemplary diagram showing the channel map CM. According FIG. 5, a normal mode and an external input mode are defined in the channel map CM. The tuner 12 is defined as an input source of sound signals and image signals corresponding to each of the channels of the normal mode. Further, in the normal mode, the frequencies of the television broadcasting that the tuner 12 should receive corresponding to each of channels are also defined. On the other hand, the external input terminal 23 and the docking unit 17 e.g. are defined as the input sources of sound signals and image signals corresponding to each of the channels of the external input mode.

For example, the input terminal 23 is corresponding to the input source of sound signals and image signals of a video 1 mode as one of the channels of the external input mode. And, a media player mode α (first player device mode) and a media player mode β (second player device mode) can be defined as two of the channels of the external input mode. The docking unit 17 is corresponding to the input source of sound signals and image signals of the media player mode α. On the other hand, the docking unit 17 is corresponding to the input source of sound signals of the media player mode β and the OSD signals generated by the microcomputer 11 is corresponding to the input source of image signals of the media player-mode β. For example, the channel map CM is updated in a predetermined time period and the channel map CM is updated by performing an auto-preset by users.

The microcomputer 11 accepts a selection of one of the channels of the normal mode or the external input mode listed in the channel map CM through the remote control receiver 18. In addition, disabling flags (illustrated as circular solid dots) can be appended to the channels. The channels that the disabling flags are appended, can not be selected. In case, the microcomputer 11 accepts the selection of one of the channels, a current flag (illustrated as a circular double outline dot) is appended to the channel selected in the channel map CM. The microcomputer 11 makes the switching circuit 22 switch to the input sources corresponding to the channel selected. Further, if one of the channels of the normal mode is selected, the microcomputer 11 instructs for the tuner 12 to tune to the frequency corresponding to the channel selected. Then, the microcomputer 11 append a last flag (illustrated as a triangular outline dot) to the channel of the normal mode that is selected at the last time in the channel map CM.

In step S120, the microcomputer 11 performs a process to add the media player mode α and the media player mode β as two of the channels of the external input modes in the channel map CM. That is, the disabling flags are appended to the media player mode α and the media player mode β before step S120, the media player mode α and the media player mode β are substantially added to the channel map CM as effective channels by removing the disabling flags in step S120. By adding the media player mode α and the media player mode β to the channel map CM as mentioned above, the media player mode α and the media player mode β can be selected by channel up-down operations e.g. Of course, channels and modes that are not defined in the channel map CM can not be selected by the remote control's operations e.g.

Next, the microcomputer 11 detects a current power mode of the television 10 in step S130. Here, in case the microcomputer 11 detects that the current power mode of the television 10 is a standby mode, the microcomputer 11 make the power circuit 21 supply a main power to the television 10 for switching to a normal mode in step S140. On the other hand, the microcomputer 11 detects that the current power mode of the television 10 is the normal mode, the microcomputer 11 make the power circuit 21 keep to supply the main power the television 10 for keeping the normal mode.

Next, the microcomputer 11 judges whether the media player 50 is currently playing any media files in step S150. That is, the microcomputer 11 detects whether the media player 50 is inserted into the hollow portion 24c with playing any media files. Here, in case the microcomputer 11 detects that the media player 50 is currently playing any media file, the microcomputer 11 detects what types of the media files is currently played by the media player 50. That is, three kinds of playing states (illustrated as playing states from A to C) described below, are detects by the microcomputer 11 in step S150 and S160.

A: None of the media files is played.
B: A media file (files) including sounds and images is (are) played.
C: A media file including only sounds is played.

In addition, users can generally make a setting to select whether to allow the media player 50 to output the sound signals and the image signals to the I/O terminal unit 59. In the present embodiment, the media player 50 is allowed to output the sound signals and the image signals played by the media player 50 to the I/O terminal unit 59 without modification. Methods described below can be applied as methods for detecting in which playing states from A to C the media player 50 is, in step S160. For example, if the O/S or the application program executed by the CPU 51a of the media player 50, has a function to return property data of the media files currently played in response to a request from the microcomputer 11, the microcomputer 11 can detect in which playing states of the media player 50 is, based on the property data.

Further, the microcomputer 11 can detect in which playing states the media player 50 is, by detecting signal or electrical conditions at the connecting terminal unit 17d (or the I/O terminal unit 59) where the sound signals and image signals are input. For example, the microcomputer 11 can judge whether the image signals is output by detecting synchronization signals included in the image signals. Further, supplemental terminals for notifying existences of the sound signals and image signals can be provided in the connecting terminal unit 17d (or the I/O terminal unit 59) in order to judge whether the sound signals and image signals are output. In addition, it can be assumed that image signals for displaying an UI image for playing the media files are output through the connecting terminal unit 17d (and the I/O terminal unit 59), even if the media player 50 is playing the media file including only the sound signals. In this instance, the playing state B and C can not be distinguished based on the signal or electrical conditions at the connecting terminal unit 17d (or the I/O terminal unit 59). However, the playing states B and C can be distinguished based on, for example, waveforms or an amount of information (e.g. bit-rates) of the image signals, because the UI image have little motion and is limited to some patterns.

In case the microcomputer 11 detects that the media player 50 is in the playing state B in step S160, the microcomputer 11 switches the television 10 to perform the media player mode α in step S170. In the media player mode α, the signal adjustment circuit 17a of the docking unit 17 is activated in order to adjust the sound signals and image signals input through the connecting terminal unit 17d, and the sound signals and image signals adjusted by the signal adjustment circuit 17a are input to the image processing circuit 13 and the sound processing circuit 14 by switching the switching circuit 22. Therefore, the sound signals and image signals currently output by the media player 50 can be output from the speaker 20 and the LCD panel 16a of the television 10. In addition, the microcomputer 11 can switch to the media player mode α, because the media player mode α is made effective in the channel map CM in step S120.

As described above, in case the microcomputer 11 detects that the media player 50 is in the playing state B, the sound signals and image signals currently output by the media player 50 can be output to the television 10 through the connecting terminal unit 17d (and the I/O terminal unit 59). Therefore, the sound signals and image signals can be output from the speaker 20 and the LCD panel 16a of the television 10. For example, in case the media player 50 is playing a news video with sounds, the speaker 20 and the LCD panel 16a output sounds and images of the news. As described above, the television 10 can be automatically switched to perform the media player mode α when the media player 50 is connected to the television 10, therefore users can continuously watch and listen the images and sounds by the television 10, the images and sounds are used to be played by the media player 50.

On the other hand, in case the microcomputer 11 detects that the media player 50 is in the playing state C in step S160, the microcomputer 11 switches the television 10 to perform the media player mode β in step S180. In the media player mode β, the signal adjustment circuit 17a is activated in order to adjust the sound signals input through the connecting terminal unit 17d, and only the sound signals adjusted by the signal adjustment circuit 17a are input to the sound processing circuit 14 by switching the switching circuit 22. Further, in the media player mode β, the image signals is input from the microcomputer 10 to the image processing circuit 13 by switching the switching circuit 22. And, in the media player mode β, the microcomputer 10 generate the OSD signals and the OSD signals are output to the image processing circuit 13. Accordingly, the OSD signals are displayed in the LCD panel 16a. In addition, the microcomputer 11 can switch to the media player mode β, because the media player mode β is made effective in the channel map CM in step S120.

Figure 6:
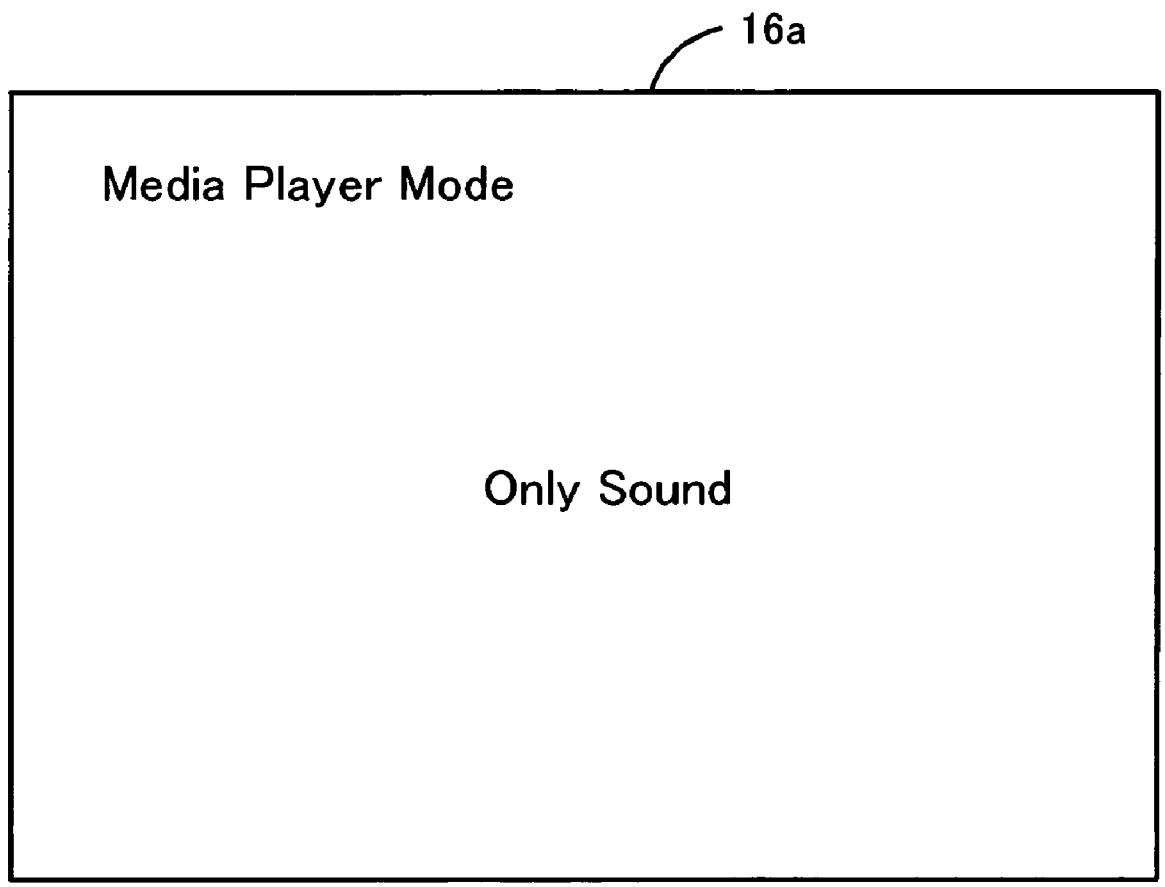
FIG. 6 is an exemplary diagram showing a dummy image.

FIG. 6 is an exemplary diagram showing a dummy image displayed in the LCD panel 16a according to the OSD signals. In FIG. 6, messages indicating that the media player mode is currently activated and only sounds are currently output. By displaying such the dummy image, it can be possible to let users recognize a current status of the television 10. The media player mode β can prevent the television 10 from displaying a random noise image and a solid color image even when the media player 50 output no image signals. Accordingly, users can not falsely recognize that the television 10 is broken down. On the other hand, the sounds can be output from the speaker 20 of the television 10 as the media player 50 is playing, therefore users can listen to the sounds played by the media player 50 from the speaker 20.

In case the microcomputer 11 detects that the media player 50 is in the playing state A in step S150, it can be understood that neither the sound signals nor the image signals are input to the connecting terminal unit 17d (and the I/O terminal unit 59), because, for example, the media player 50 is currently turned off. In step S190, the microcomputer 11 generates a predetermined operation commands and transmits the operation commands to the CPU 51a of the media player 50 through the connecting terminal unit 17d (and the I/O terminal unit 59), in order to make the media player 50 be able to play the media files. By the way, the media player 50 is detecting user's operations by the operation panel 57, and the operation panel 57 generates (encodes) operation commands based on the user's operations and the operation commands are accepted by the application program executed by the CPU 51a of the media player 50. And, in response to the operation commands, the CPU 51a executes processes complying with the application program. Therefore, the media player 50 can perform operations requested by users.

In step S190, the microcomputer 11 generates the predetermined consecutive operation commands and transmits the predetermined consecutive operation commands to the CPU 51a of the media player 50. The microcomputer 11 generates the operation commands same as the operation commands that the application program executed by the CPU 51a accepts from the operation panel 57. Here, the microcomputer 11 generates the operation commands same as the operation commands generated by the operation panel 57 in response to the user's consecutive operations from [1] to [6] as described below. And the microcomputer 11 (operation macro outputting unit, command outputting unit) transmits the operation commands to the CPU 51a of the media player 50 through the connecting terminal unit 17d (and the I/O terminal unit 59).

[1] M button→[2] D button→[3] D button→
[4] D button→[5] R button→[6] P button

Figure 7:
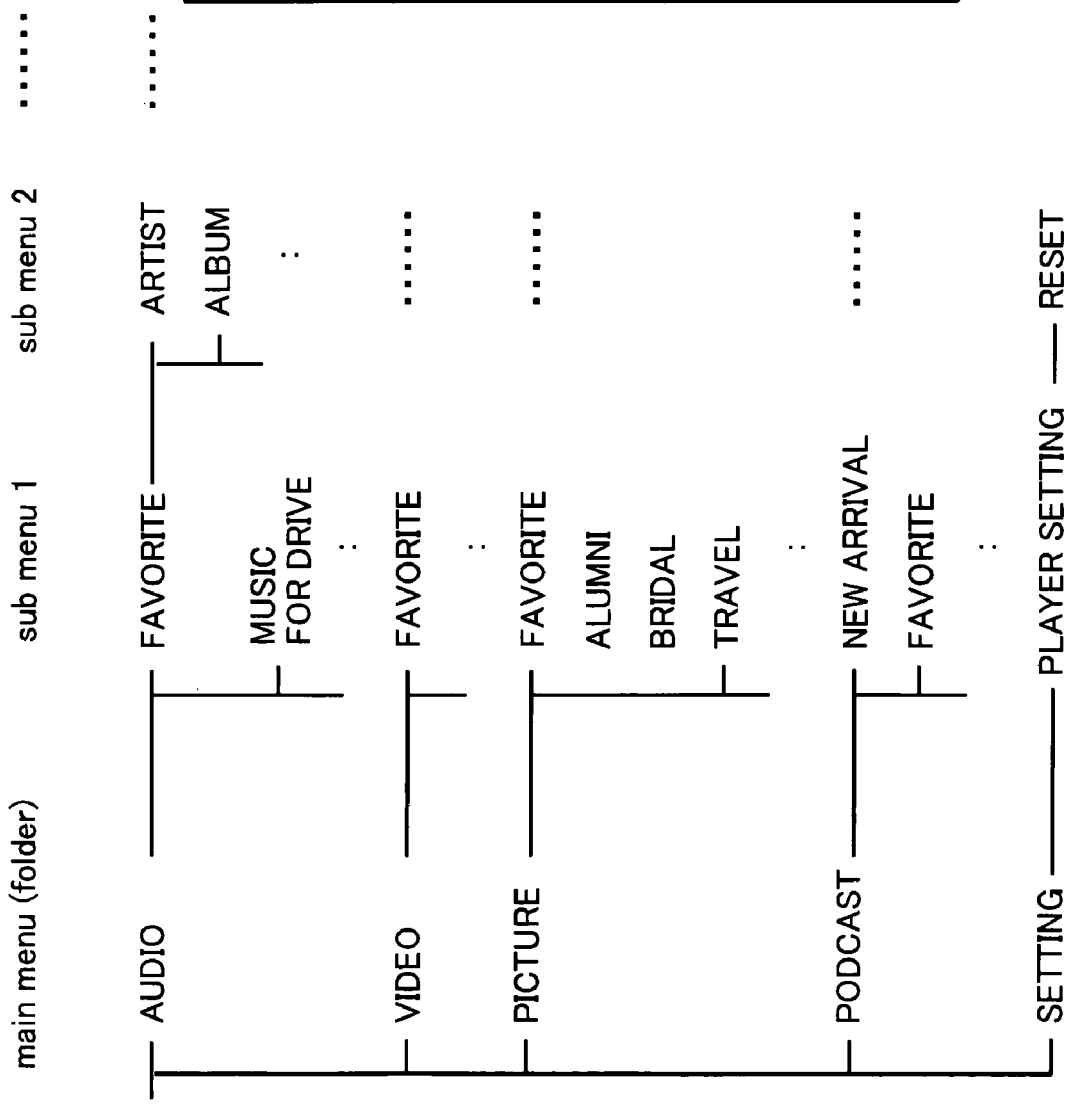
FIG. 7 is an exemplary diagram showing an operation panel and hierarchical operation menus.

FIG. 7 is an exemplary diagram showing the operation panel 57 of the media player 50 and an operation menus (structure) of the application program of the media player 50. In FIG. 7, each of the operation menus is comprised of some items and a main menu is provided as a top class of the operation menus. Each of items (media files) of the operation menus can be selected by operating the operation panel 57. The operation panel 57 is comprised on an M button for returning to the main menu, an U button for moving to upper items in a same class of the operation menus, a D button for moving to lower items in the same class of the operation menus, an L button for returning to upper (illustrated in left hand side) class of the operation menus, an R button for moving to lower (illustrated in right hand side) class of the operation menus, and a P button for determining (playing) a selected item (media file). In case, the CPU 51a of the media player 50 receive the operation commands corresponding to the consecutive operations from [1] to [6], first, an "AUDIO" folder that is a top item of the main menu is selected by the command corresponding to the operation [1]. In addition, if the media player 50 has been turned off, the media player 50 is turned on by the command corresponding to the operation [1]. Next, a "PODCAST" folder is selected by moving downward three times in the main menu according to the commands corresponding to the operations from [2] to [4]. And, a "NEW ARRIVAL" folder that is a top item of the "PODCAST" folder is selected by the command corresponding to the operation [5]. In a state that the "NEW ARRIVAL" folder that is selected, the media files belonging to the "NEW ARRIVAL" folder are played by the command corresponding to the operation [6].

Here, the "NEW ARRIVAL" folder is a folder wherein the media files that are recorded in the HDD 51d after the media player 50 was used the last time, are temporarily stored. For example, the "NEW ARRIVAL" folder is the folder wherein the media files that are transmitted into the HDD 51d from an external computer connected to the media player 50 in a USB[Universal serial bus] mass storage mode after finishing using the media player 50, are temporarily stored.

And, recently, RSS[Resource Description Framework Site Summary] feeds for downloading the media files regularly or irregularly uploaded in external severs in the internet, become widely used. Further, the new arrived media files downloaded to the computer by the RSS feeds are transmitted to the media player and stored in the "NEW ARRIVAL" folder. In addition, it is not necessary to store the new arrived media files in a physical "NEW ARRIVAL" folder. For example, the new arrived media files can be presumed to be stored in a virtual "NEW ARRIVAL" folder by appending flags indicating new arrival to each of the new arrived media files. In addition, not only the media files including sounds and images, but also the media files including only sounds can be downloaded by the RSS feeds. The media files including sounds and images, and the media files including only sounds may coexist in the "NEW ARRIVAL" folder in the present embodiment.

The microcomputer 11 of the television 10 can make the media player 50 perform consecutive operations originally requiring complicated manipulations for the operation panel 57 by consecutively generating and consecutively transmitting the commands corresponding to the operations from [1] to [6]. These operations of the media player 50 are corresponding to a combination of the plurality of the manipulations for the operation panel 57 and the commands corresponding to the operations from [1] to [6] can be considered as an operation macro. Transmitting timing for each of the commands corresponding to the operations from [1] to [6] is complying with an order from [1] to [6], in case a next command can not be accepted before a operation according to a previous command have finished (for example, the CPU 51a becomes a busy state.), it is preferable that the next command is transmitted after waiting to finish the operation according to the previous command.

Similarly to step S150, the microcomputer 11 judges whether the media player 50 is currently playing any media files in step S200. Here, in case the microcomputer 11 detects that the media player 50 is playing nothing, it can be detects that the "NEW ARRIVAL" folder is vacant. Therefore, the microcomputer 11 determines that there is no media file to be played and the microcomputer 11 finishes the process. On the other hand, in case the microcomputer 11 detects that the media player 50 is playing any of the media files, the microcomputer 11 returns to step S160 and the microcomputer 11 detects what types of the media files is currently played by the media player 50 (the microcomputer 11 detects in which playing states B or C the media player 50 is). In case the microcomputer 11 detects that the media player 50 is playing the media files including the sounds and the images, the microcomputer 11 switches the television 10 to perform the media player mode a in step S170. Therefore, the sound signals and image signals currently output by the media player 50 can be appreciated through the speaker 20 and the LCD panel 16a of the television 10. On the other hand, in case the microcomputer 11 detects that the media player 50 is playing the media files only including the sounds, the microcomputer 11 switches the television 10 to perform the media player mode β in step S180. Therefore, the sound signals from the media player 50 are output from the speaker 20 and the dummy image generated by the microcomputer 11 is displayed on the LCD panel 16a. The media files including sounds and images, and the media files including only sounds may coexist in the "NEW ARRIVAL" folder in the present embodiment, though, a proper media player mode corresponding to the kinds of the media files being played can be performed.

As described above, the speaker 20 can output the sounds of the media file being played or the media files stored in the "NEW ARRIVAL" folder when users set the media player 50 into the hollow portion 24c of the television 10. Further, in case these media files include both sounds and images, the images can be also displayed by the LCD panel 16a of the television 10. The television 10 can not estimate when the media player 50 will finish playing the media file being played or all of the media files stored in the "NEW ARRIVAL" folder when users set the media player 50 into the hollow portion 24c of the television 10. In step S220, the microcomputer 11 periodically performs a process to judge whether the media player 50 is currently playing any of the media files. This process is similar to that performed in step S150.

In case the microcomputer 11 detects that the media player 50 is not playing any of the media files, it can be considered that the media player 50 have finished playing all of the media files that have to be played. Then, the microcomputer 11 terminates the media player mode α or the media player mode β (returns to the normal mode) and the microcomputer 11 terminates this process. For example, the microcomputer 11 controls the tuner 12 to receive a channel that was finally received before the television 10 switched to the media player mode α (in step S170) or the media player mode β (in step S180). The microcomputer 11 can specify the channel that was finally received, because the last flag (illustrated as the triangular outline dot) was appended to the channel that was finally received. On the other hand, in case the microcomputer 11 detects that the media player 50 is currently playing any of the media files, the microcomputer 11 returns to step S160. That is, the microcomputer 11 detects what types of the media files is currently played by the media player 50 (the microcomputer 11 detects in which playing states B or C the media player 50 is) and the microcomputer 11 performs to switch to the media player mode α or the media player mode β corresponding to the media files currently played. As explained above, by periodically repeating steps from S150 to S230, the microcomputer 11 can monitor a playing state of the media player 50 and the microcomputer 11 can return to the normal mode when the media player 50 finish playing the media files. Further, by periodically detecting what types of the media files is currently played by the media player 50, the LCD panel 16a can display the dummy image according to the types of the media files.

C. A Process Performed After the Media Player is Connected

Figure 8:
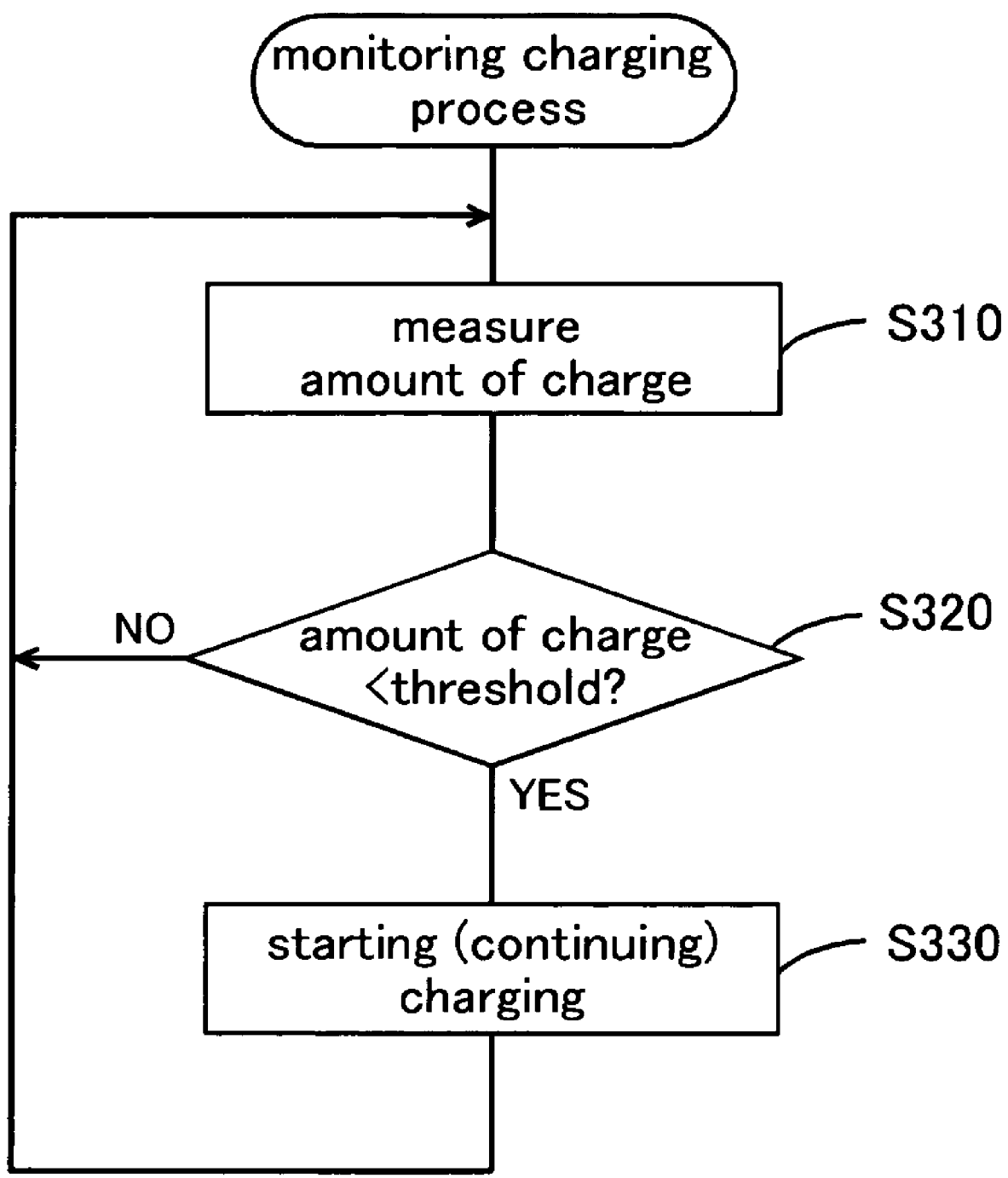
FIG. 8 is an exemplary flowchart of a monitoring charging process.

The process performed when (just after) the media player 50 is connected to the television 10 is explained above, a process performed after the media player 50 to the television 10 will be explained below. FIG. 8 is an exemplary flowchart of a monitoring charging process performed after the media player 50 to the television 10. In step S310, the charging circuit 17b of the docking unit 17 periodically measures an amount of charge of the battery 54 in the media player 50 through the connecting terminal unit 17d and the I/O terminal unit 59. And, in case the amount of charge is less than a predetermined threshold, the microcomputer 11 makes the charging circuit 17b perform to charge the battery 54 in step S320. However, in case the charging switch 17c is slid to the off-side direction, the power supply line is cut off. Therefore, in case the charging switch 17c is slid to the off-side direction, substantially, the charging the battery 54 can not be performed. On the other hand, the amount of charge is not less than the predetermined threshold, the microcomputer 11 does not make the charging circuit 17b perform to charge the battery 54 and returns to step S310. The microcomputer 11 can always judge whether the amount of charge of the battery 54 has reached the predetermined threshold and can stop charging that is started when the media player 50 is connected to the television 10 (in step S110), because the monitoring charging process described above is periodically performed while the media player 50 is connected to the television 10. Therefore, futile electricity consumption can be prevented. Further, the charging can be also started, in case users slide the charging switch 17c to the on-side direction after the media player 50 is connected to the television 10 and the amount of the charge is not less than the predetermined threshold. In addition, timings to perform this monitoring charging process can be determined based on elapsed time from starting to charge.

Figure 9:
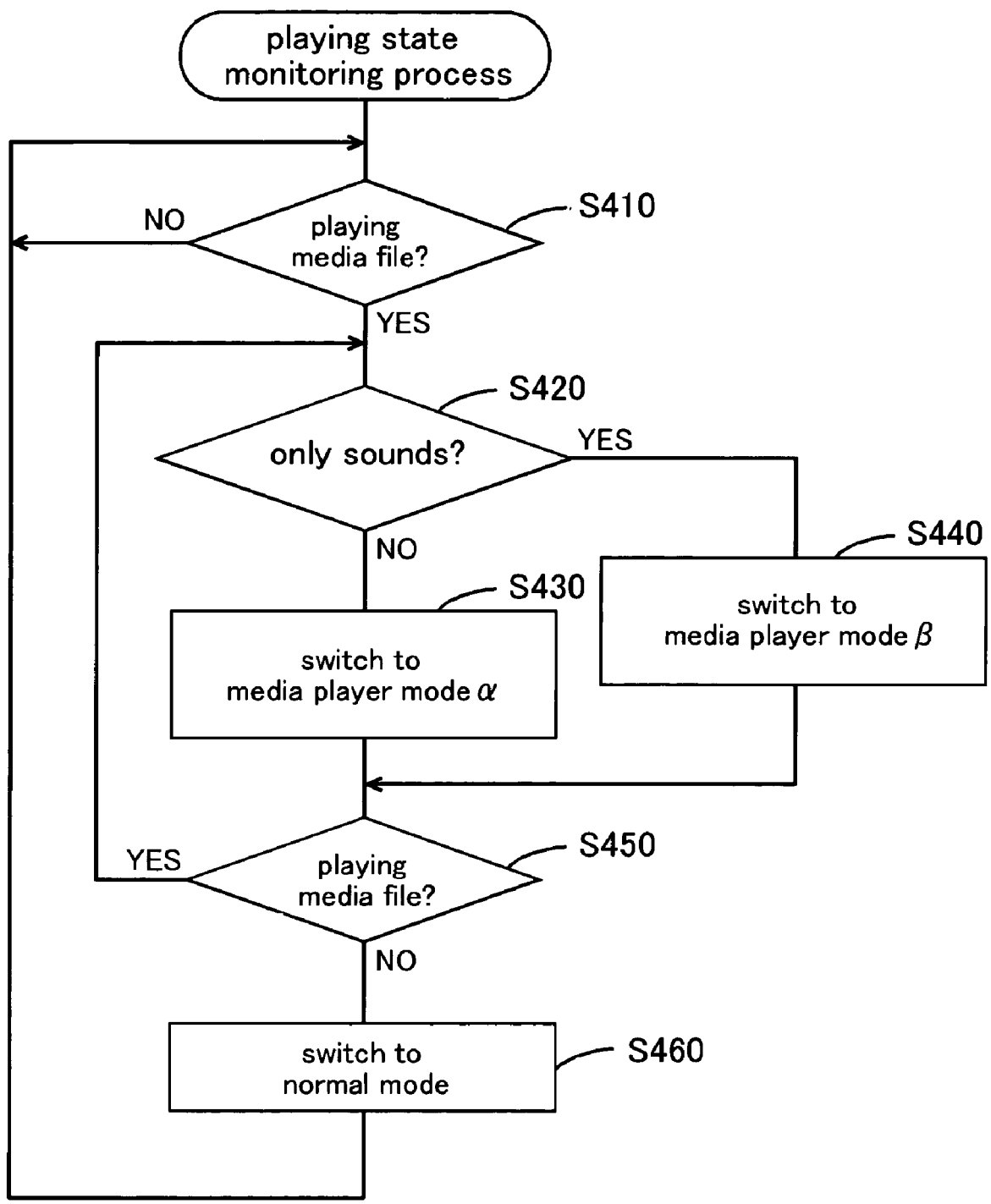
FIG. 9 is an exemplary flowchart of a playing state monitoring process.

By the way, users may want to make the media player 50 play the media files even if the media player 50 did not play the media files when the media player 50 is connected the television 10 and only charging is performed at the beginning. Therefore, the microcomputer 11 of the television 10 performs a playing state monitoring process explained below. FIG. 9 is an exemplary flowchart of the playing state monitoring process to monitor the playing state of the media player 50. According to FIG. 9, steps same as the steps from S150 to S220 of the connecting process illustrated in FIG. 4 are performed. The playing state monitoring process is periodically performed after the connecting process is terminated. In addition, the connecting process is terminated with returning from the media player modes to the normal mode in step S230 or without switching to the media player modes in step S210. Therefore, the playing state monitoring process is performed while the television 10 does not perform the media player modes (i.e. the television 10 performs the normal mode.).

In steps S410 and S420 of the playing state monitoring process, the microcomputer 11 detects in which the playing states from A to C (as follows) the media player 50 is (a playing state detecting unit). In addition, explanations of processes performed in steps S410 and S420 will be omitted, because the processes performed in steps S410 and S420 are same as that performed in the connecting process illustrated in FIG. 4.

A: None of the media files is played.

B: A media file (files) including sounds and images is (are) played.

C: A media file including only sounds is played.

In case, the microcomputer 11 detects that the media player 50 is in the playing state A in step S410, the microcomputer 11 return to continuously monitor the playing states of the media player 50. In case, the microcomputer 11 detects that the media player 50 is in the playing state B in step S420, the microcomputer 11, similarly to the connecting process (illustrated in FIG. 4), switches the television into the media player mode α in order to accept both the sound signals and the image signals from the media player 50.

And, in case, the microcomputer 11 detects that the media player 50 is in the playing state C in step S420, the microcomputer 11, similarly to steps S180 of the connecting process (illustrated in FIG. 4), switches the television into the media player mode β in order to accept only the sound signals from the media player 50 and display the dummy image by the LCD panel 16a. Accordingly, the television 10 can be automatically switched into the media player modes α or β by making the media player 50 play any of the media files after connecting to the media player 50 and the television 10. In addition, the television 10 can be switched to the media player modes α and β, because the media player modes α or β should be added to the channel map CM, in advance, in the connecting process (illustrated in FIG. 4).

In step S450, in step S450, the microcomputer 11 periodically performs a process similar to steps S220 of the connecting process (illustrated in FIG. 4), to judge whether the media player 50 is currently playing any of the media files. In case the microcomputer 11 detects that the media player 50 is not playing any of the media files, it can be considered that the media player 50 have finished playing all of the media files that have to be played. Then, the microcomputer 11 terminates the media player mode α or the media player mode β (returns to the normal mode). On the other hand, in case the microcomputer 11 detects that the media player 50 is currently playing any of the media files, the microcomputer 11 returns to step S420. That is, the microcomputer 11 detects what types of the media files is currently played by the media player 50 (the microcomputer 11 detects in which playing states B or C the media player 50 is) and the microcomputer 11 performs to switch to the media player mode α or the media player mode β corresponding to the media files currently played. Accordingly, the microcomputer can switch to one of the media player modes α and β that is suitable to the kind of the media file currently played.

Figure 10:
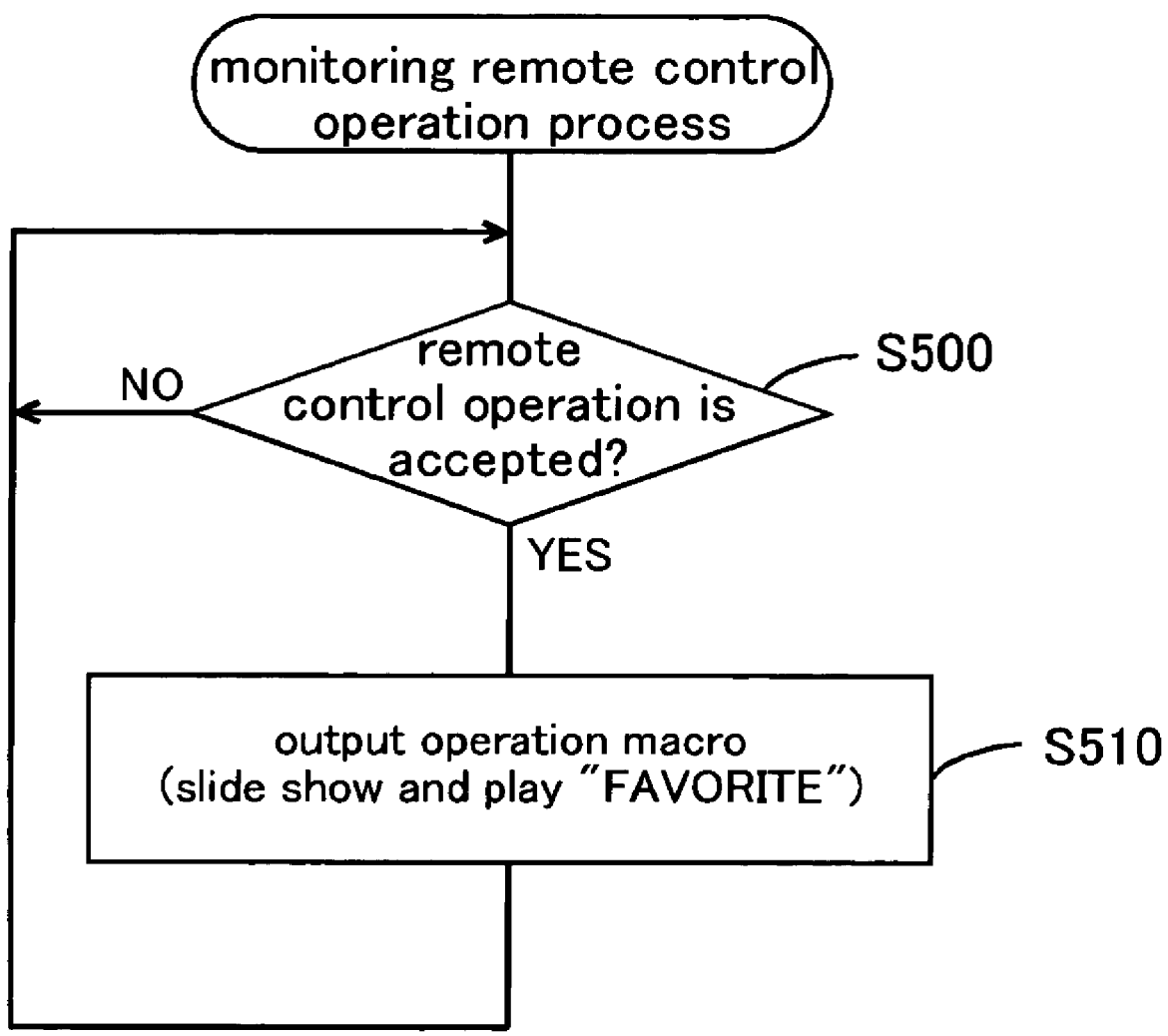
FIG. 10 is an exemplary flowchart of a monitoring remote control operation process.

As explained above, the television 10 can be cooperated with the media player 50, by connecting the media player 50 to the television 10. The television 10 can use functions of the media player 50 by giving operations to the television 10. FIG. 10 is an exemplary flowchart of a monitoring remote control operation process. According to FIG. 10, the microcomputer detects inputting predetermined signals from the remote control receiver 18, in step S500. These predetermined signals mean signals generated by the remote control receiver 18 in response to receiving a pulse of infrared transmitted by pushing a "slide show and audio" button of a remote control (not illustrated). Therefore, the microcomputer judges whether the "slide show and audio" of the remote control is pushed.

In case the "slide show and audio" button formed on the remote control is not pushed, the microcomputer 10 return to steps S500 to repeat same process. On the other hand, in case the "slide show and audio" of the remote control is pushed, the microcomputer 11 generates the operation commands same as the operation commands generated by the operation panel 57 in response to the user's consecutive operations from [1] to [8] as described below. And the microcomputer 11 transmits the operation commands to the CPU 51a.

[1] M button→[2] D button→[3] D button→
[4] R button→[5] P button→[6] M button→
[7] R button→[8] P button Then the media player 50 performs consecutive operations complying with the operation commands.

That is, first, the media player 50 can returns to a determinate state (i.e. the main menu) from arbitrary states set by users, by transmitting the operation command corresponding to the operation [1]. In addition, if the media player 50 has been turned off, the media player 50 is turned on by the command corresponding to the operation [1]. Next, a "PICTURE" folder is selected by moving downward twice in the main menu according to the commands corresponding to the operations [2] and [3]. Further, the media player 50 moves to lower class of the "PICTURE" folder and selects a "FABRITE" folder that is top of this class, according to the operation command corresponding to the operation [4].

Next, by transmitting the operation command corresponding the operation [5], a slide show is performed with sequentially displaying every image files stored in the "FABRITE" folder. In addition, the image files are, for example, image data that show pictures shot by digital still cameras. Further, the media player 50 again returns to the main menu by transmitting the operation command corresponding to the operation [6]. Then the "AUDIO" folder that is top of the main menu is selected. Next a "FAVORITE" folder that is top of the "AUDIO" folder is selected according to the operation command corresponding to the operation [7]. Further, every audio files stored in the "FAVORITE" folder of the "AUDIO" folder, are sequentially played, by transmitting the operation command corresponding to the operation [8] instructing to play.

The operation commands corresponding to the operations from [1] to [8] are the operation macro, and complicated manipulations for the operation panel 57 of the media player 50 can be replaced to the pushing the "slide show and audio" button of the remote control. By performing step S510, the image according to the pictures can be sequentially displayed in the LCD display 53 of the media player 50. Stimulatingly, the sound according to the audio files can be output by the sound output unit 55 of the media 50. Further, these sound signals according to the pictures and the audio files according to the audio files can be output through the I/O terminal unit 59, and these sound signals and the audio files are input to the television 10 connected to the I/O terminal unit 59. Accordingly, the media player plays the media files including sounds and images, therefore, the microcomputer 11 of the television 10 switches to the media player mode α because this playing state is detected in the playing state monitoring process. Then, the sound signals and the image signals are input to the sound processing circuit 14 and the image processing circuit 13 and the speaker 20 and are output from the LCD panel 16a of the television 10. Therefore, users can appreciate favorite music and pictures by the television 10.

D. A Process Performed when the Media Player is Disconnected

Figure 11:
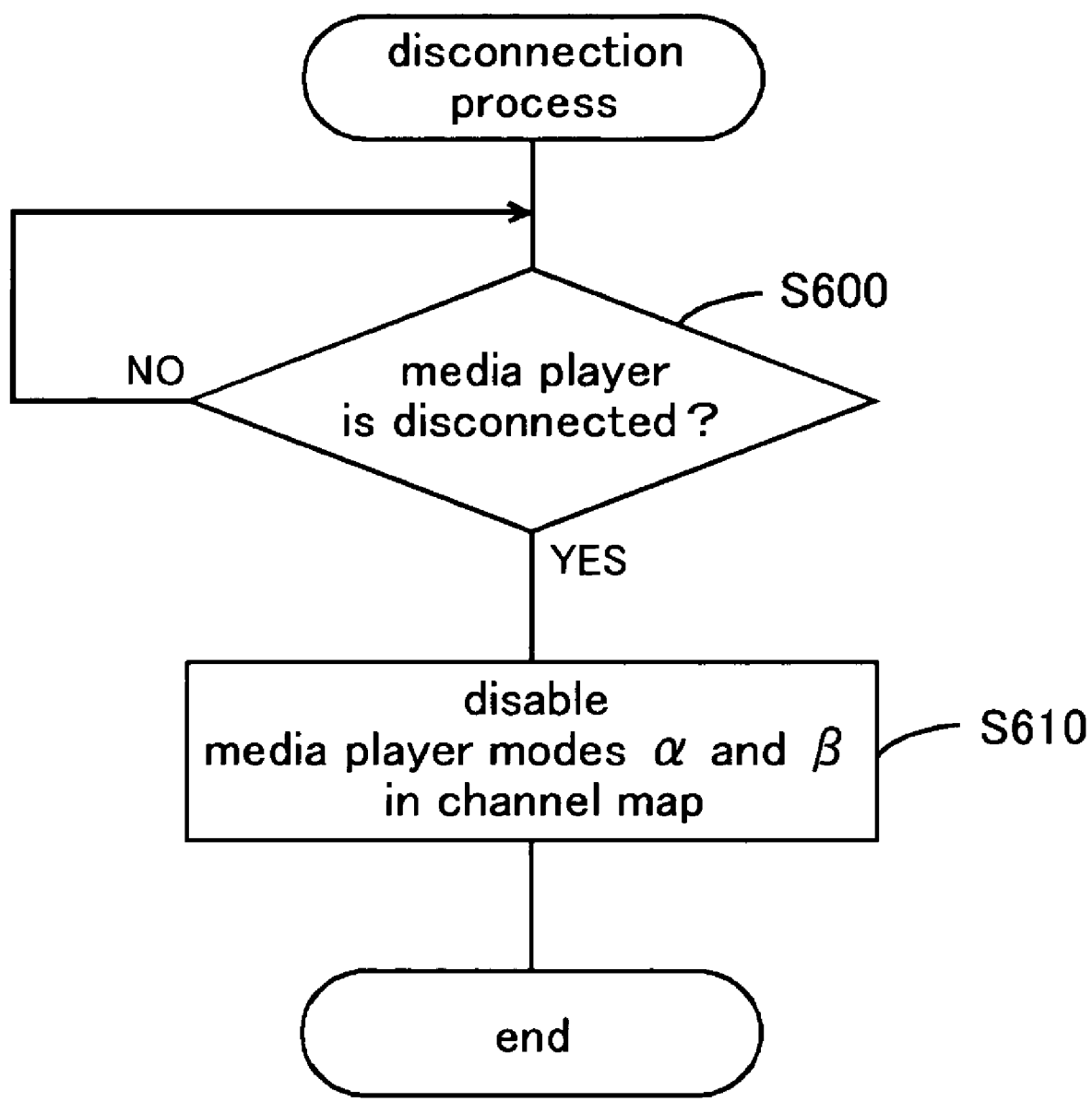
FIG. 11 is an exemplary flowchart of a process performed when the media player is detached from the television.

FIG. 11 is an exemplary flowchart of a process performed when the media player 50 is detached from the television 10. The process illustrated in FIG. 11 is performed when the bottom edge of the media player 50 is detached from the hollow portion 24c of the television 10. First, in steps S600, the microcomputer 11 detects that the media player 50 is detached from the hollow portion 24c and waits until the media player 50 is detached from the hollow portion 24c (disconnection detecting unit). As a method for detecting a disconnection of the bottom edge of the media player 50 from the hollow portion 24c, for example, a method detecting a change of resistance of the connecting terminal unit 17d that is affected by an electrical disconnection between the connecting terminal unit 17d and the I/O terminal unit 59 of the media player 50, can be applied. Further, a method using a mechanical switch operated by detaching the bottom edge of the media player 50 from the hollow portion 24c, can be also applied.

In case the disconnection between the television 10 and the media player 50 is detected, the microcomputer 11 performs to read the channel map CM from the ROM 11c and to append the disabling flags (illustrated as solid dots) to the media player modes α and β in the channel map CM (disabling unit). The media player modes α and β are channels that are enabled only if the media player 50 is connected to the television 10 and the media player modes α and β does not exist as effective channels when the media player 50 is not connected to the television 10. Therefore, it is possible to prevent the television 10 from being switched to the media player modes α and β, in case the media player 50 is not connected to the television 10.

Figure 12:
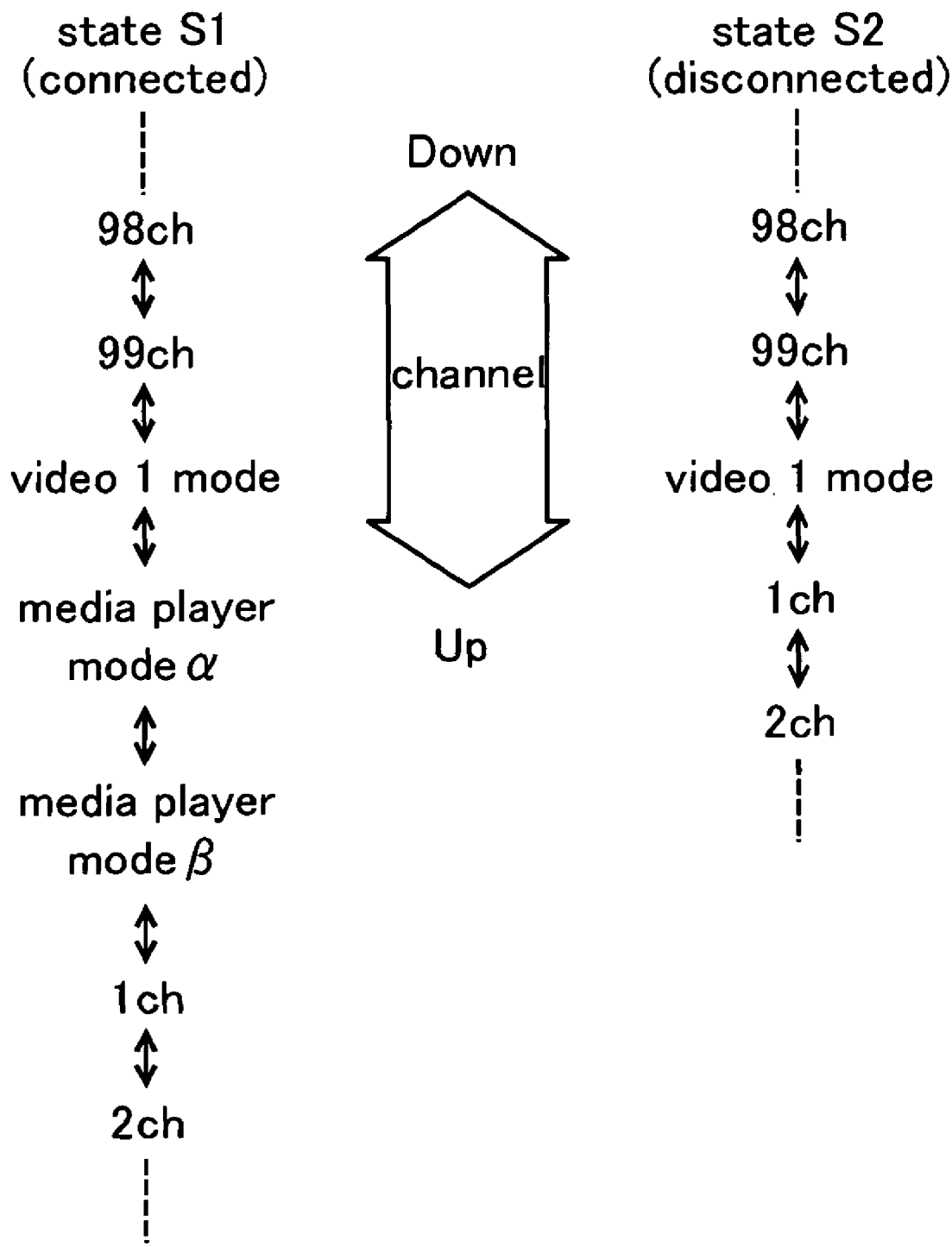
FIG. 12 is an exemplary diagram explaining a state when channel up-down operation is done.

FIG. 12 is an exemplary schematic diagram explaining switching orders when channel up-down operations are accepted in each of a state S1 (the television 10 and the media player 50 are connected) and a state S2 (the television 10 and the media player 50 are disconnected). The channels (modes) defined in the channel map CM are orderly switched according to the channel up-down operations input by the remote control (arbitrarily switching unit). Therefore, the television 10 can be switched into both the media player modes α and β in the state S1 that the media player modes α and β are enabled in the channel map CM. On the other hand, the media player modes α and β are skipped and the television 10 can not be switched into neither the media player modes α nor β in the state S2 that the media player modes α and β are disabled in the channel map CM. Consequently, it is possible to prevent the television 10 from being switched into the media player modes α and β and from being non (image and sound)-signals input state.

E. Modified Embodiments

E-1. The Modified Embodiment of the Dummy Image

In the embodiment described above, in case the media player 50 plays the media files only including sounds, the dummy image based on the OSD signals generated by the microcomputer 11 is output by the LCD panel 16a. This dummy image should, at least, make the television 10 notify users of that the media player 50 is functioning well, and this dummy image should not limited to that illustrated in FIG. 6. For example, the dummy image can function as a screen saver by periodically moving letters of the dummy image illustrated in FIG. 6. For example, in case the present invention applied to a plasma display panel, it is preferable to apply the dummy image with the screen saver function.

Further, an entertainment function can be added to the dummy image in order not to bore users when the television 10 output only the sound signals from the media player 50. For example, the dummy image can be a slide show of pictures based on image files stored in the ROM 11c of the television 10. The OSD signals to display the slide show are generated by the microcomputer 11. Further, in case the television 10 has a memory card slot, a HDD and optical disk drive, the image files for the slide show can be stored in them. For example, users can watch the slide show of favorite pictures and listen sounds from the media player 50 by inserting a memory card storing the favorite pictures into the memory card slot.

Further, the dummy image should not limited to be completely generated by the microcomputer 11, and the dummy image can be generated by combining the OSD signals generated by the microcomputer 11 and image signals coming from other input sources. For example, the dummy image can be generated by combining the OSD signals generated by the microcomputer 11 and the image signals based on the television broadcasting signals received by the tuner 12. For example, users can watch a television channel such as a sport channel that has less importance of sounds, with listening sounds from the media player 50. By displaying the television channel with the message notifying that the television 10 is outputting the sound signals coming from the media player 50, it can be prevent users from misunderstanding that the television 10 is out of order. Further, as concrete method for combining the image signals based on the television broadcasting signal and the ODS signals, they can be superimposed in a common area and each of them can be displayed in divided areas of the LCD panel 16a.

E-2. A Power Saving Operation

Figure 13:
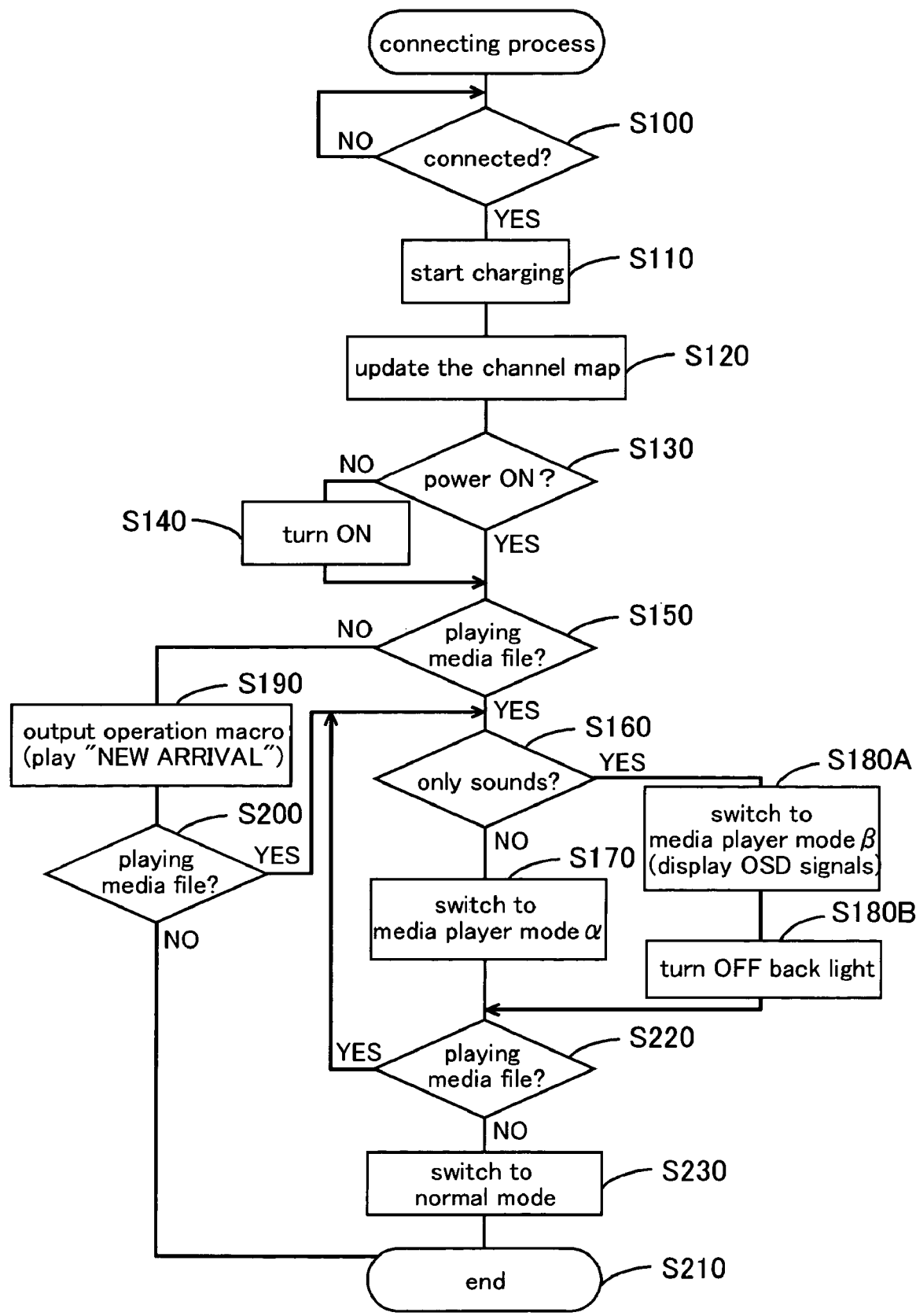
FIG. 13 is an exemplary flowchart of the connecting process of a modified embodiment.

In the embodiment described above, the dummy image is displayed in case the media player 50 outputs only sound signals to the television 10 (the playing state C is detected), the dummy image don't have to be displayed in view of power saving. FIG. 13 is an exemplary flowchart of the connecting process of a modified embodiment. The connecting process of this embodiment is almost same as the connecting process the former embodiment (FIG. 4). However, the process (corresponding to step S180 of the former embodiment) for switching the television 10 to the media player mode β if the media player 50 plays the media files only including sounds, are different from that of the former embodiment. In this embodiment, processes of step S180A and S180B are performed instead of the process corresponding to step S180. In step S180A, the microcomputer 11 performs to switch the television 10 to the media player mode β, similarly to step S180 of the former embodiment. Stimulatingly, the microcomputer 11 generates OSD signals and output the dummy image.

Figure 14:
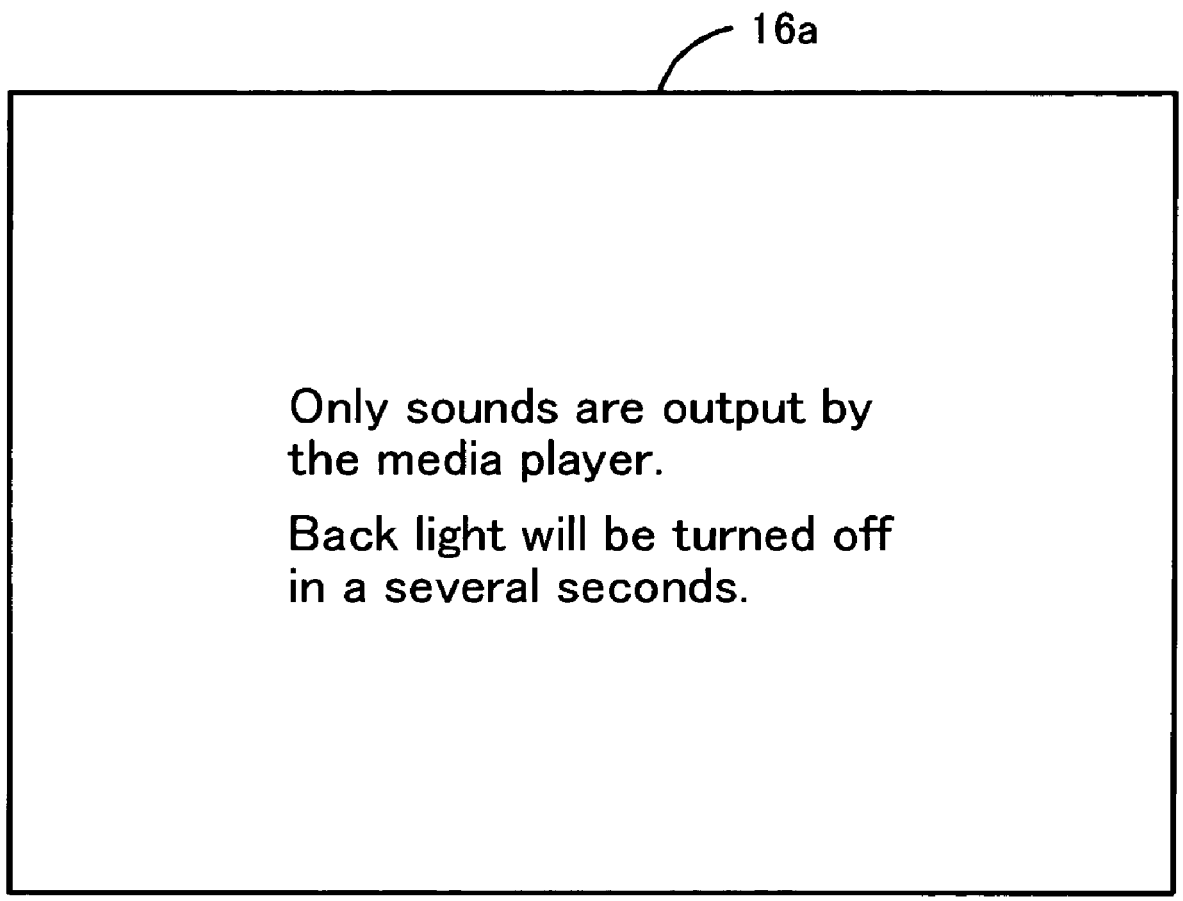
FIG. 14 is an exemplary diagram showing the dummy image of the modified embodiment.

FIG. 14 is an exemplary diagram showing the dummy image of this modified embodiment. As illustrated, a massage indicating "The media player 50 is only outputting sounds. So the back light will be turned of in a several seconds." is displayed in the dummy image. Next, step S180B is performed, after the dummy image is displayed. In step S180B, the microcomputer 11 instructs the power circuit 21 to stop to supply the inverter circuit 16d. Accordingly, the back light is turned off, and the power consumption can be decreased. Further, it is possible to prevent users from misunderstanding that the television 10 is out of order by notifying users of an extinction of the back light, in advance. In addition, the back light is turned off after the dummy image is once displayed in this embodiment, though the back light can be immediately turned off when the microcomputer 11 detects that the media player 50 plays the media files only including sounds.

E-3. The Modified Embodiment of Charging

Figure 15:
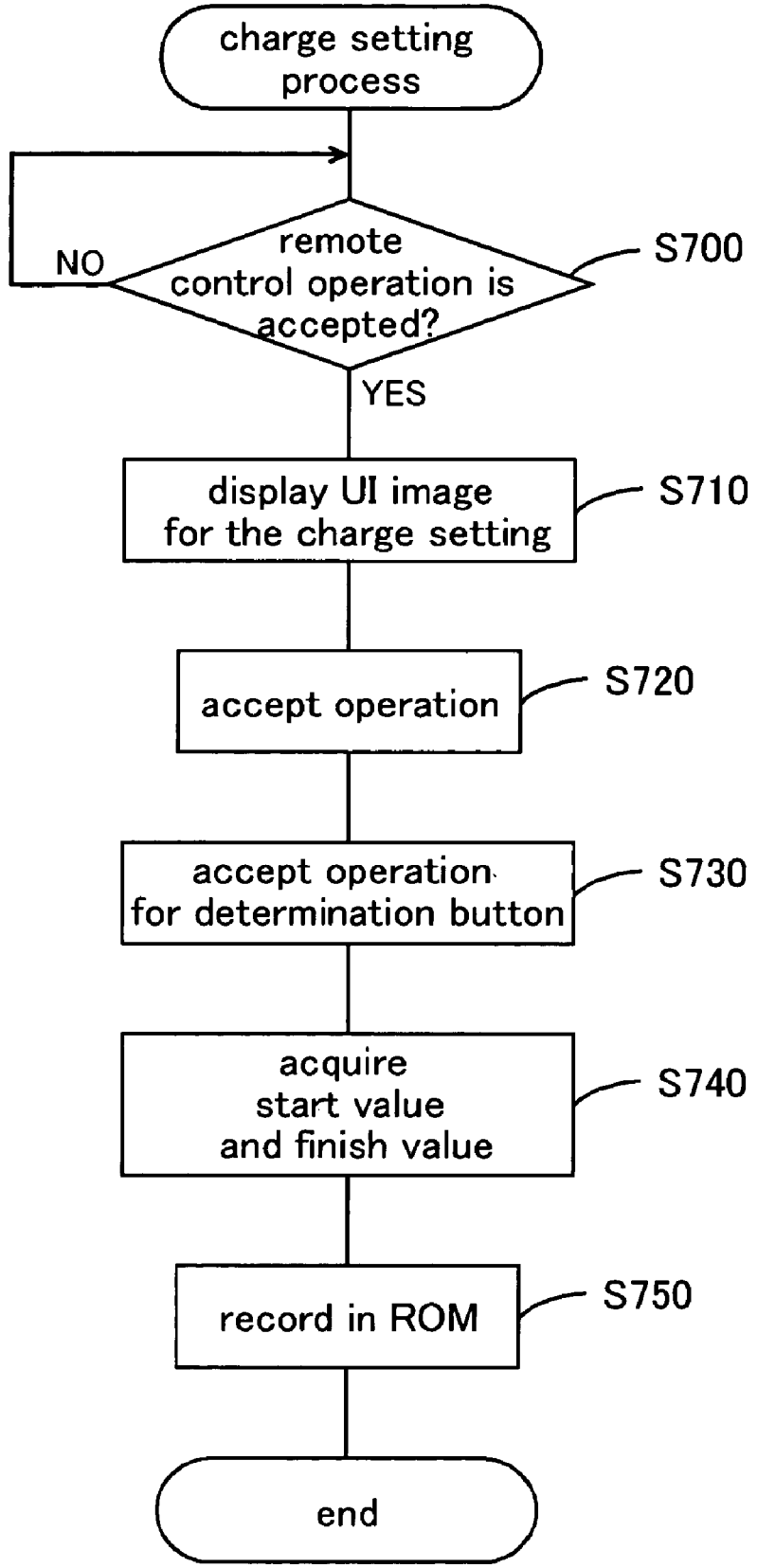
FIG. 15 is an exemplary flowchart of charge setting process of the modified embodiment.

FIG. 15 is an exemplary flowchart of charge setting process of the modified embodiment. In FIG. 15, the microcomputer 11 judges whether predetermined signals are input from the remote control receiver 18 in step S700. These predetermined signals mean signals generated by the remote control receiver 18 in response to receiving a pulse of infrared transmitted by pushing a "charge setting" button of a remote control (not illustrated). In case, the microcomputer 11 detects that the "charge setting" button is pushed in step S700, the microcomputer 11 generates predetermined OSD signals and displays a UI image for the charge setting based on the OSD signals in step S710. Next, the microcomputer 11 accepts user's operation to the remote control in response to the UI image for the charge setting.

FIG. 16 is an exemplary diagram of the UI image for the charge setting. According to FIG. 16, check boxes to select ON/OFF of a function for preventing memory effect problem are provided in the UI image for the charge setting. In case, ON is selected, the amount of charge to start charging can be specified by a concrete numeric value. Further, the amount of charge to finish charging can be specified by a concrete numeric value. In step S720, the microcomputer 11 accepts signals corresponding to user's operation to the remote control in response to the UI image for the charge setting from the remote control receiver 18, and the microcomputer 11 the UI image for the charge setting based on the signals from the remote control receiver 18.

In step S730, the microcomputer 11 judges whether signals corresponding to user's operation pushing a "determination button" provided in the remote control (not illustrated), are input. In case, these signals are input, the numeric values specifying the amount of charge to start charging and the amount of charge to finish charging based on user's operation are acquired by the microcomputer 11, in step S740. In case, OFF is selected, the microcomputer 11 sets a start value (a lower limit) as 0% and sets a finish value (an upper limit) as 100%. In case, ON is selected, the microcomputer 11 sets the start value as the numeric value specifying the amount of charge to start charging and sets the finish value as the numeric value specifying the amount of charge to finish charging. The start value and the finish value set by the microcomputer are written to the ROM 11c in step S750.

Figure 17:
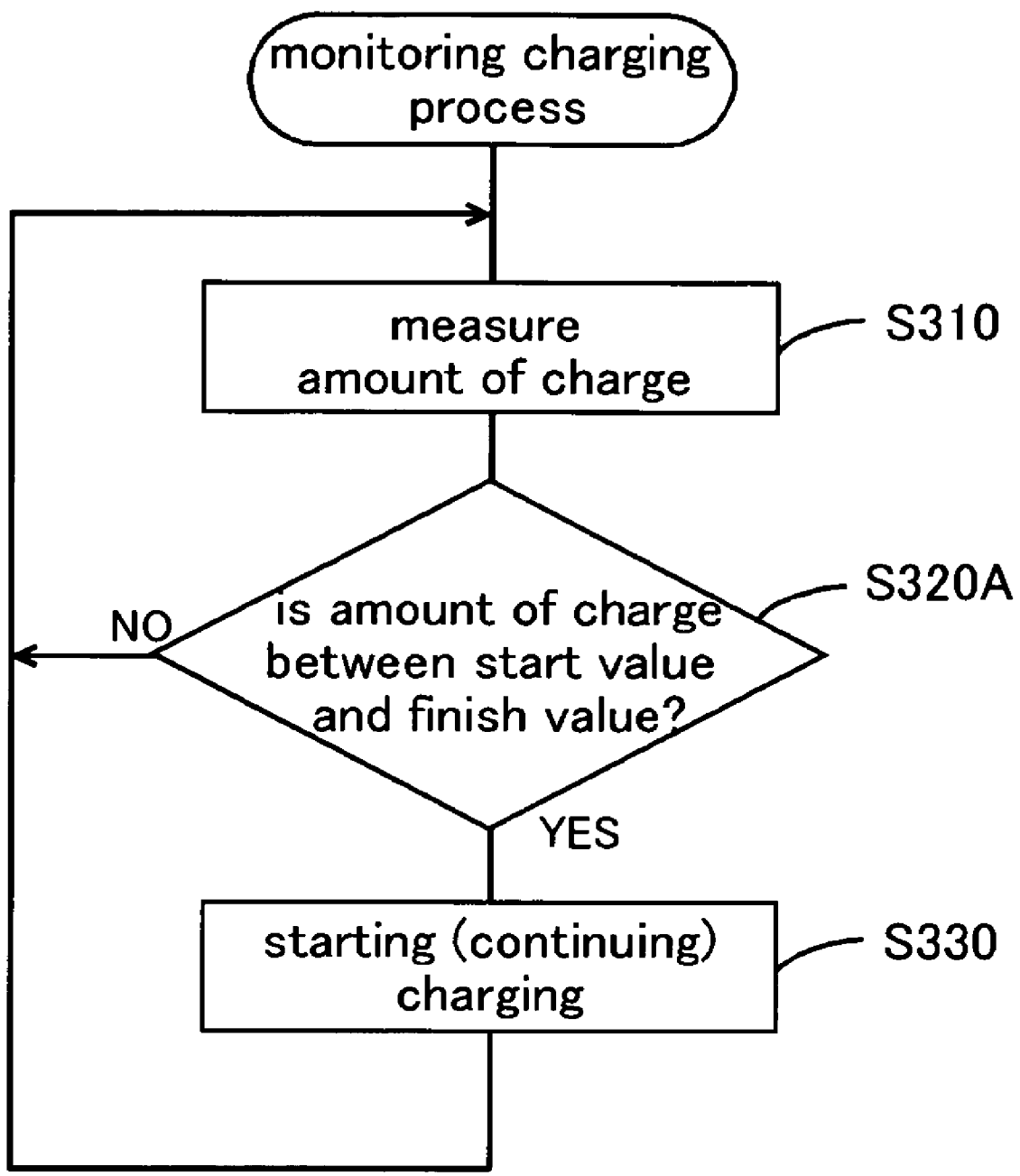
FIG. 17 is an exemplary flowchart of the monitoring charging process of the modified embodiment.

FIG. 17 is an exemplary flowchart of the monitoring charging process of the modified embodiment. The monitoring charging process of this embodiment is almost same as that of the former embodiment (illustrated in FIG. 8), the monitoring charging process of this embodiment executes step S320A as a replacement of step S320 of the former embodiment. In step S320A, the microcomputer 11 reads the start value and the finish value from the ROM 11c, and the microcomputer 11 judges whether the amount of charge of the battery 54 measured in step S310 is between the start value and the finish value.

In case, the amount of charge of the battery 54 is between the start value and the finish value, the microcomputer 11 makes the charging circuit 17b charge the battery 54. On the other hand, the amount of charge of the battery 54 is not between the start value and the finish value, the microcomputer 11 does not make the charging circuit 17b charge the battery 54 and returns to step S300. Accordingly, user can arbitrarily adjust the amount of charge to finish charging. Therefore, just necessary amount can be charged. Further, user can arbitrarily adjust the amount of charge to start charging. For example, it can be possible to prevent the charging circuit 17b from charging until fully discharge (the amount of charge becomes substantially 0%). Therefore, it can be possible to prevent the memory effect problem. In addition, a condition to finish charging is designated by the amount of charge, though the condition to finish charging can be designated by a charging time. In addition, in case OFF is selected, the amount of charge of the battery 54 is always between the start value (0%) and the finish value (100%). In this circumstance, the microcomputer 11 always makes the charging circuit 17b charge the battery 54. In addition, user can restrict not to perform to charge by designating the amount of charge to start charging same as the amount of charge to finish charging, even if the charging switch 17c is slid to the on-side direction (charge preventing unit).

E-4. The Modified Embodiment of an Operation Macro

In the embodiment described above, in case the media player 50 does not play any of the media files when the media player 50 is connected to the television 10, the microcomputer 11 outputs the operation macro to make the media player 50 play media files stored in "NEW ARRIVAL" folder. The microcomputer 11 can also outputs the operation macro to make the media player 50 play media files stored in "NEW ARRIVAL" folder in response to the user's operation to the remote control in the monitoring remote control operation process (illustrated in FIG. 10). Further, the operation macro can be edit by users. In the monitoring remote control operation process, in case the "slide show and audio" of the remote control is pushed, the microcomputer 11 generates the operation commands same as the operation commands generated by the operation panel 57 in response to the user's consecutive operations from [1] to [8] as described below.

[1] M button→[2] D button→[3] D button→
[4] R button→[5] P button→[6] M button→
[7] R button→[8] P button For example, this operation macro can be edited by users.

FIG. 18 is an exemplary diagram showing a UI image for edition the operation macro: This UI image is displayed by the LCD panel 16a according to the ODS signals generated by the microcomputer 11 in response to a predetermined operation to the remote control. In this UI image, a folder tree image E1 to select a folder storing the image files to be slid according to the operation macro is provided. And, another folder tree image E2 to select a folder storing the sound files to be played according to the operation macro is provided. The microcomputer 11 can display these folder tree images E1 and E2 by asking the O/S executed by the media player 50 a folder (menu) structure of the HDD 51d in advance. User can select and determine the folder storing the image files that users want to slide and the folder storing the sound files that users want to play in the folder tree images E1 and E2.

In addition, the folders selected in the folder tree images E1 and E2 are expressed as selection folders F1 and F2. After determination of the selection folders F1 and F2, the microcomputer 11 specifies operations necessary to move from the "AUDIO" folder that is top of the main menu illustrated in FIG. 7 to each of the selection folders F1 and F2. And the operation macro corresponding to specified operations is set by the microcomputer 11. For example, in case the selection folders F1 is a "TRAVEL" folder that is included in the "PICTURE" folder and is lower than the "FABRITE" folder that is top of the folders included in the "PICTURE" folder by two folders, the operation macro corresponding to the user's consecutive operations from [1] to [7] as described below is set by the microcomputer 11.

[1] M button→[2] D button→[3] D button→
[4] R button→[5] D button→[6] D button→
[7] P button For example, in case the selection folders F2 is a "MUSICS FOR DRIVE" folder that is included in the "AUDIO" folder and is below the "FABRITE" folder that is top of the folders included in the "PICTURE" folder, the operation macro corresponding to the user's consecutive operations from [8] to [11] as described below is additionally set by the microcomputer 11, this operation macro is followed by the operation macro corresponding to the user's consecutive operations from [1] to [7] as described above.

[1] M button→[2] D button→[3] D button→
[4] R button→[5] D button→[6] D button→
[7] P button→
[8] M button→[9] R button→[10] D button→
[11] P button This operation macro is recorded in the ROM 11c. And, in case the "slide show and audio" button is manipulated, the microcomputer 11 reads the operation macro and transmits the operation to the CPU 51a of the media player 50. Accordingly, the image files and the audio files belonging to the selection folders F1 and F2 selected by users can be slid and played.

In the embodiment described above, users can edit a part of the operation macro, that is user can select the selection folders F1 and F2 including the media files to be slid and played. Further, user can arbitrarily edit entire of the operation macro. For example, the remote control has an operation macro recording start button, an operation macro recording end button and a user's operation macro executing button. And, the micro computer communicates with the CPU 51a of the media player 50 in order to acquire operation commands received from the operation panel 57 during a time before the operation macro recording end button is pushed and after the operation macro recording start button is pushed. And, the micro computer 11 organizes the operation commands and stores them as a user's operation macro in the ROM 11c. Further, users can execute the user's operation macro by manipulating the user's operation macro executing button.

According to this embodiment, a complicated operation commands consisting of [1] to [9] described blow, can be easily executed by recoding the user's operation macro in advance.

[1] M button→[2] D button→[3] D button→
[4] D button→[5] D button→[6] R button→
[7] R button→[8] D button→[9] P button According to this user's operation macro, finally, a reset can be executed with orderly moving items of the operation menu. The media player 50 applying the tree folder (menu) structure requires many operations to reach an objective item (reset), though the reset can be easily executed by executing the user's operation macro.

E-5. The Modified Embodiment of a Connection

Figure 19:
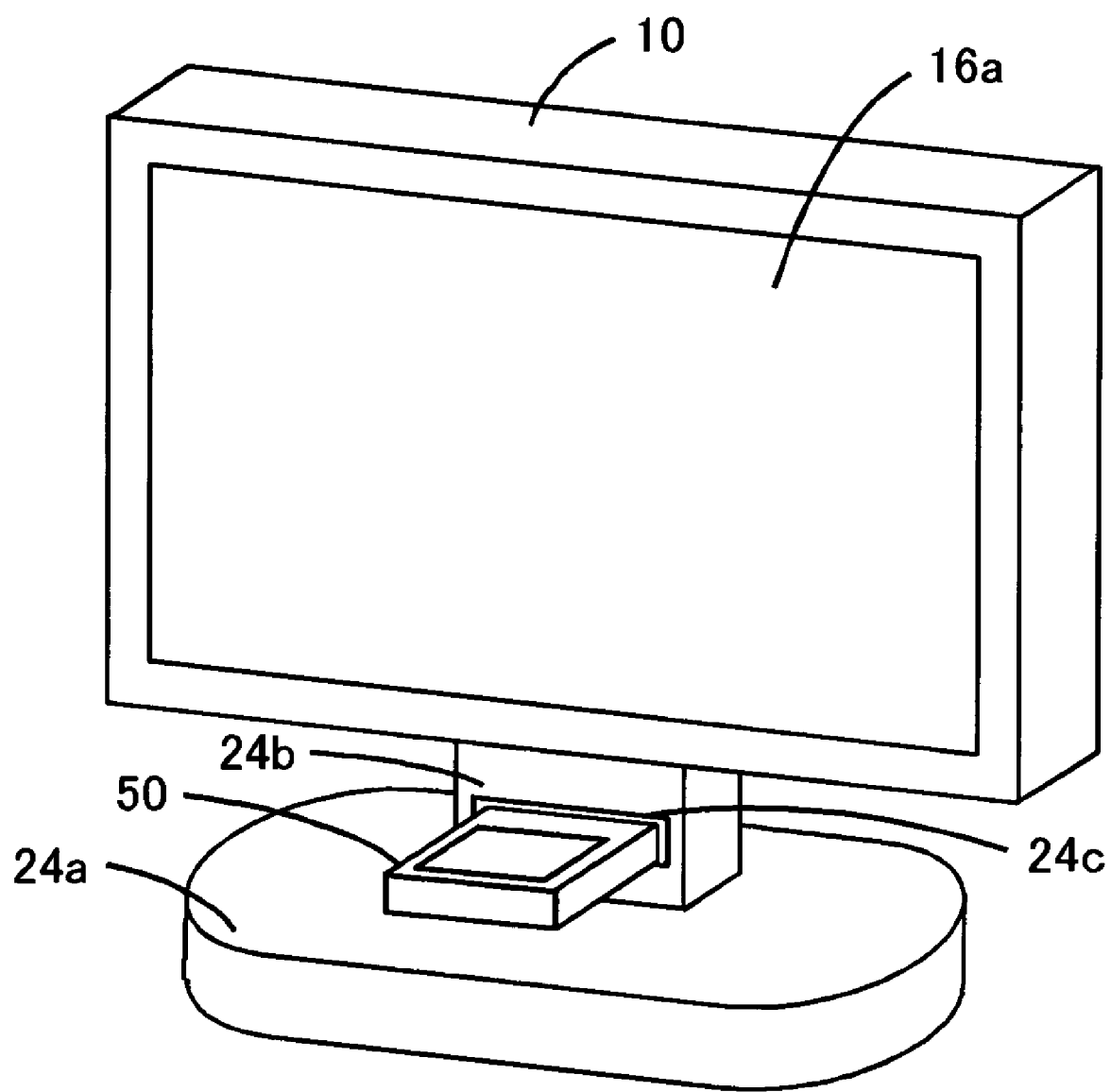
FIG. 19 is an exemplary perspective view showing the appearance of the television of the modified embodiment.
Figure 20:
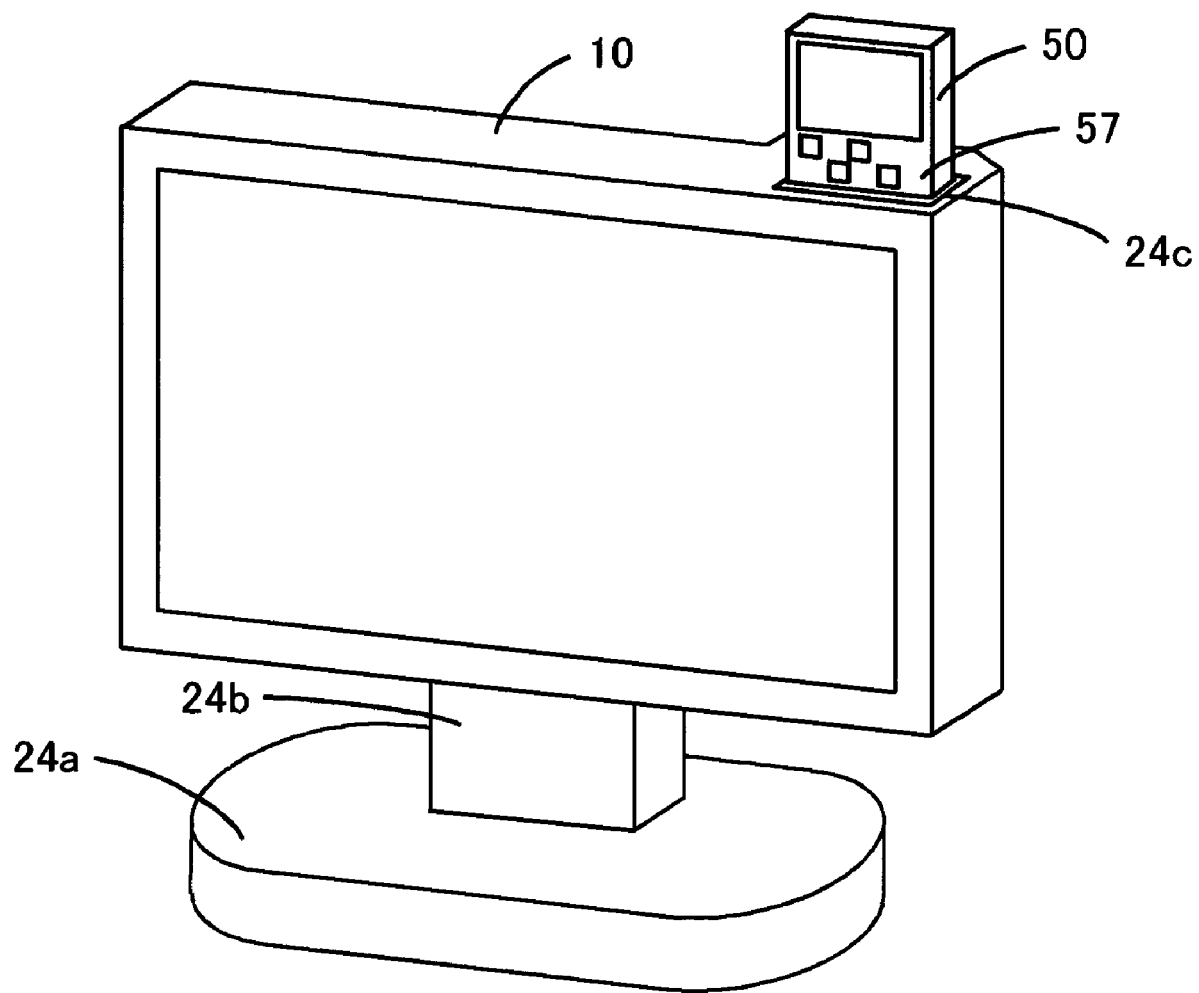
FIG. 20 is an exemplary perspective view showing the appearance of the television of the modified embodiment.

Further, a position of the television where the media player 50 is held should not be limited to the position illustrated in FIG. 2. That is, the connecting terminal unit 17d can be provided other positions, unless the media player 50 is unsteadily held to be charged. For example, as illustrated in FIG. 19, the hollow portion 24c hollowing backward is formed on a position of the brace 24b where is lower then a lower edge of the LCD panel 16a. And the bottom edge of the media player 50 is inserted backward into the hollow portion 24c. In this case, the media player 50 can be horizontally held. Further, as illustrated in FIG. 20, the hollow portion 24c hollowing downward is formed on a top plane of a flame of the LCD panel 16a. And the media player 50 can be vertically inserted to the hollow portion 24c.

The television of the present invention includes a speaker; a display; a tuner for receiving television broadcasting signals and generates first sound signals and first image signals based on the television broadcasting signals; a connecting terminal for connecting to a player device having an operation panel generating operation commands according to user's operations; an operation macro outputting unit for outputting an operation macro same as a plurality of the operation commands to the player device in order to make the player device perform consecutive operations, through the connecting terminal.

According to this configuration, the operation macro outputting unit outputs the operation macro same as a plurality of the operation commands to the player device in order to make the player device perform consecutive operations, through the connecting terminal. Therefore, the television that can easily make the player device perform the consecutive operations corresponding to a complicated user's operations for the operation panel, can be provided. Each of the operation commands is a command generated in response to each of the user's operations for the operation panel.

Further, as a particular aspect of the present invention, the operation macro outputting unit outputs the operation macro to make the player device select the media file to play and play the media file selected.

According to this configuration, the player device performs the consecutive operations to select the media file to play and to play the media file selected, according to the operation macro. Accordingly, it is possible to make the player device play a specific media file.

As another particular aspect of the present invention, the operation macro outputting unit outputs the operation macro to make the player device select the media file that was stored in the media player later than a predetermined time.

According to this configuration, the player device performs the consecutive operations to select the media file that was stored in the media player later than a predetermined time and to play the media file selected, according to the operation macro. Accordingly, it is possible to make the player device play a specific media file.

As an optional particular aspect of the present invention, the operation macro outputting unit outputs the operation macro to make the player device select image files of the media file and perform a slide show of the image files selected.

According to this configuration, the player device performs the consecutive operations to select image files of the media file and to perform a slide show of the image files selected, according to the operation macro. Accordingly, it is possible to make the player device perform the slide show.

As further particular aspects of the present invention, the television further comprises a switching unit for switching the television from a normal mode that each of the speaker and the display outputs each of the first sound signals and the first image signals to a player device mode that at least one of the speaker and the display outputs one of the second sound signals and the second image signals, when the player device is connected to the connecting terminal.

According to this configuration, the switching unit switches the television from a normal mode that each of the speaker and the display outputs each of the first sound signals and the first image signals to a player device mode that at least one of the speaker and the display outputs one of the second sound signals and the second image signals, when the player device is connected to the connecting terminal.

Needless to say, the present invention is not limited to the above mentioned embodiment. As will be apparent to those skilled in the art, the following may be disclosed as exemplary embodiments of the present invention:

To use members, structures, and the like disclosed in the above embodiment replaceable with each other by properly changing their combination.

To use what are not disclosed in the above embodiment but are of known art and replaceable with the members, structures, and the like disclosed in the above embodiment by properly replacing them with each other or by changing their combination.

To properly use members, structures, and the like not disclosed in the above embodiment but thought of by those skilled in the art as substitutes for them on the basis of known art and the like or, further, with changes made in their combination.

While the invention has been particularly shown and described with respect to preferred embodiments thereof, it should be understood by those skilled in the art that the forgoing and other changes in form and detail may be made therein without departing from the spirit and scope of the invention as defined in the appended claims.

Although the invention has been described in considerable detail in language specific to structural features or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art. Such variations and alternate embodiments are contemplated, and can be made without departing from the spirit and scope of the invention.

It is to be understood that the phraseology and terminology employed herein, as well as the abstract, are for the purpose of description and should not be regarded as limiting.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, proximal, distal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) is not used to show a serial or numerical limitation but instead is used to distinguish or identify the various members of the group.

What is claimed is:

1. A television, comprising:
a speaker;
a display;
a tuner for receiving television broadcasting signals and for generating first sound signals and first image signals based on the television broadcasting signals;
a connecting terminal for connecting the television and a player device having an operation panel generating operation commands according to user's operations;
an operation macro outputting unit for generating an operation macro including a plurality of command having functionality commensurate with the operation commands, the generated operation macro includes at least a first command for returning to a main menu of operation menus of the player device, a second command for shifting a selected item in a same class of the operation menus, a third command for moving to lower class of the operation menus and a fourth command for playing a selected item, and for outputting the generated operation macro to the player device in order to make the player device perform consecutive operations based on the generated operation macro, through the connecting terminal.

2. A television as set forth in claim 1, wherein:
the operation macro outputting unit outputs the generated operation macro to make the player device select a media file to play and play the media file selected.

3. A television as set forth in claim 2, wherein:
the operation macro outputting unit outputs the generated operation macro to make the player device select the media file that was stored in the media player later than a predetermined time.

4. A television as set forth in claim 1, wherein:
the operation macro outputting unit outputs the generated operation macro to make the player device select image files of the media file and perform a slide show of the image files selected.

5. A television as set forth in claim 1, further comprising:
a switching unit for switching the television from a normal mode that each of the speaker and the display outputs each of the first sound signals and the first image signals to a player device mode that at least one of the speaker and the display outputs one of the second sound signals and the second image signals, when the player device is connected to the connecting terminal.

6. A television, comprising:
a speaker;
a display;
a tuner for receiving television broadcasting signals and for generating first audio signals and first image signals based on the television broadcasting signals;
a connecting terminal for connecting the television and a player device having an operation panel generating operation commands according to user's operations;
a detecting unit for detecting whether the player device is currently playing any media files;
an operation macro outputting unit for generating an operation macro including a plurality of command having functionality commensurate with the operation commands and for outputting the generated operation macro to the player device through the connecting terminal,
when the detecting unit detects that the player device is not playing any media files currently, the operation macro outputting unit generates the operation macro including at least a first command for returning to a main menu of operation menus of the player device, a second command for shifting a selected item in a same class of the operation menus, a third command for moving to lower class of the operation menus and a fourth command for playing a selected media file, and outputs the generated operation macro to the player device in order to make the player device select day the selected media file based on the generated operation macro; and a switching unit for switching the television from a normal mode where the speaker outputs the first audio signals and the display outputs the first image signals to a player device mode where at least one of the speaker and the display outputs one of second audio signals and second image signals based on the media file played by the player device, when the player device is playing the selected media file.

\* \* \* \* \*